United States Patent
Yeom et al.

(10) Patent No.: US 12,515,707 B2
(45) Date of Patent: Jan. 6, 2026

(54) SYSTEM AND METHOD FOR REDUCING INJURY TO AN OCCUPANT CAUSED BY A COLLISION

(71) Applicants: HYUNDAI MOTOR COMPANY, Seoul (KR); KIA CORPORATION, Seoul (KR)

(72) Inventors: Myung Ki Yeom, Incheon (KR); In Su Kim, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 138 days.

(21) Appl. No.: 18/537,335

(22) Filed: Dec. 12, 2023

(65) Prior Publication Data
US 2025/0074469 A1    Mar. 6, 2025

(30) Foreign Application Priority Data
Sep. 4, 2023 (KR) .......................... 10-2023-0116706

(51) Int. Cl.
*B60W 30/09* (2012.01)
*B60W 60/00* (2020.01)
*G06Q 30/0283* (2023.01)

(52) U.S. Cl.
CPC ........ *B60W 60/0016* (2020.02); *B60W 30/09* (2013.01); *G06Q 30/0283* (2013.01);
(Continued)

(58) Field of Classification Search
CPC ............. B60W 60/0016; B60W 30/09; B60W 2554/4042; B60W 2554/4044;
(Continued)

(56) References Cited

U.S. PATENT DOCUMENTS

2014/0350790 A1* 11/2014 Akesson ............ B62D 15/0265
701/41
2017/0291602 A1* 10/2017 Newman ............... B60W 10/18
(Continued)

FOREIGN PATENT DOCUMENTS

DE 102008005310 A1 * 7/2009 ............ B60W 30/09
EP 3756962 A1 * 12/2020 ............ B60W 30/09
(Continued)

Primary Examiner — Daniel M. Robert
(74) Attorney, Agent, or Firm — Lempia Summerfield Katz LLC

(57) ABSTRACT

A system includes an autonomous driving controller configured to calculate data necessary to control rotation of a host vehicle when collision between the host vehicle and another vehicle is expected. The autonomous driving controller determines an expected collision position based on a heading angle of the other vehicle approaching the host vehicle and the center of the host vehicle. The autonomous driving controller determines whether the expected collision position and the position of an occupant of the host vehicle correspond to each other. Upon determining that the expected collision position and the position of the occupant correspond to each other, the autonomous driving controller calculates data necessary to rotate the host vehicle based on a safety index indicating the degree of damage to the occupant depending on a collision position and the position of the occupant.

20 Claims, 9 Drawing Sheets

(52) U.S. Cl.
CPC ............... *B60W 2554/4042* (2020.02); *B60W 2554/4044* (2020.02); *B60W 2554/802* (2020.02)

(58) Field of Classification Search
CPC ....... B60W 2554/802; B60W 30/0956; B60W 2030/082; B60W 30/08; B60W 10/08; B60W 10/18; B60W 10/20; B60W 40/02; B60W 50/0097; B60W 2040/0881; B60W 2420/403; B60W 2420/408; B60W 2554/80; G06Q 30/0283; B60Y 2300/08; B60Y 2306/01; B60Y 2400/3015; B60Y 2400/3017
See application file for complete search history.

(56) References Cited

U.S. PATENT DOCUMENTS

2019/0031189 A1* 1/2019 Patana ................... B60W 10/20
2025/0074469 A1* 3/2025 Yeom .................... B60W 30/09

FOREIGN PATENT DOCUMENTS

| JP | 2006062419 A | * | 3/2006 | |
| KR | 20180015017 A | * | 2/2018 | ............ B60W 40/02 |

* cited by examiner

SYSTEM AND METHOD FOR REDUCING INJURY TO AN OCCUPANT CAUSED BY A COLLISION

CROSS-REFERENCE TO RELATED APPLICATION

This application claims under 35 U.S.C. § 119(a) the benefit of and priority to Korean Patent Application No. 10-2023-0116706 filed on Sep. 4, 2023, the entire contents of which are incorporated herein by reference.

TECHNICAL FIELD

The present disclosure relates to a system and a method for reducing damage to an occupant caused by collision and particularly relates to a system and a method for determining the possibility of collision between a parked vehicle in which an occupant is present and another vehicle and for controlling the parked vehicle so as to minimize damage to the occupant.

BACKGROUND

For convenience of users driving vehicles, vehicles are equipped with various sensors and electronic devices. In particular, an autonomous driving system that enables a vehicle to recognize the surrounding environment and to automatically travel to a desired destination by itself without intervention by a driver according to the recognized surrounding environment has been actively developed.

A vehicle equipped with such an autonomous driving system is referred to as an autonomous vehicle. In other words, the autonomous vehicle is capable of recognizing the surrounding environment and automatically traveling to a desired destination by itself without intervention by a driver according to the recognized surrounding environment.

A vehicle equipped with an autonomous driving system has a function of predicting and avoiding collision with a surrounding vehicle. However, when a vehicle is in a turned-off state after parking or stoppage, there is no way to avoid collision with another vehicle. Further, there is no clear reference to how a parked vehicle avoids collision with another vehicle. Furthermore, when a parked vehicle is not able to avoid collision with another vehicle, there is no clear reference to how to control the parked vehicle.

The above information disclosed in this Background section is only to enhance understanding of the background of the present disclosure. Therefore, this Background section may contain information that does not form the related art that is already known to a person of ordinary skill in the art.

SUMMARY

The present disclosure has been made in an effort to solve the above-described problems associated with the related art. Objects of the present disclosure are to provide a system and a method for reducing damage to an occupant caused by collision. The system and the method may control a host vehicle using a safety index indicating the degree of damage to an occupant depending on the relationship between the position of the occupant and a collision position and thus may minimize damage to the occupant caused by collision.

In one aspect, the present disclosure provides a system for reducing damage to an occupant caused by collision. The system includes an autonomous driving controller configured to calculate data necessary to control rotation of a host vehicle when collision between the host vehicle and another vehicle is expected. The autonomous driving controller determines an expected collision position based on a heading angle of the other vehicle approaching the host vehicle and the center of the host vehicle. The autonomous driving controller determines whether the expected collision position and the position of an occupant of the host vehicle correspond to each other. Upon determining that the expected collision position and the position of the occupant correspond to each other, the autonomous driving controller calculates data necessary to rotate the host vehicle based on a safety index indicating the degree of damage to the occupant depending on a collision position and the position of the occupant.

In an embodiment, the autonomous driving controller may calculate a collision index indicating the possibility of collision between the host vehicle and the other vehicle while the other vehicle approaches the host vehicle. When the collision index is equal to or greater than a first threshold value, the autonomous driving controller may supply power to components configured to rotate the host vehicle. When the collision index is equal to or greater than a second threshold value, the autonomous driving controller may determine whether the expected collision position and the position of the occupant correspond to each other. The second threshold value may be larger than the first threshold value.

In another embodiment, when the expected collision position and the position of the occupant do not correspond to each other, the autonomous driving controller may calculate data necessary to rotate the host vehicle so as to minimize damage to the host vehicle using a robustness index indicating the degree of damage to the host vehicle depending on the heading angle of the other vehicle and the collision position.

In still another embodiment, a collision index may be calculated based on at least one of a speed of the other vehicle, a distance between the host vehicle and the other vehicle, or an expected collision area. The expected collision area may be an area in which a virtual shape indicating the other vehicle overlaps a virtual shape indicating the host vehicle in a state of being moved at the heading angle by a distance between the center of the host vehicle and the other vehicle.

In yet another embodiment, a determination as to whether the expected collision position and the position of the occupant correspond to each other may be a determination as to whether the occupant is located within the expected collision area.

In still yet another embodiment, when the expected collision position and the position of the occupant do not correspond to each other, the autonomous driving controller may calculate, using the robustness index, a rotation direction, a rotation angle, and a center of rotation of the host vehicle as data necessary to rotate the host vehicle. The autonomous driving controller may determine whether an additional expected collision position corresponds to the position of the occupant. The additional expected collision position may be an expected collision position between the host vehicle and the other vehicle after the host vehicle is rotated based on the rotation direction, the rotation angle, and the center of rotation of the host vehicle.

In a further embodiment, upon determining that the additional expected collision position corresponds to the position of the occupant, the autonomous driving controller may not perform rotation control of the host vehicle. Upon determining that the additional expected collision position does not correspond to the position of the occupant, the autonomous driving controller may output a command to rotate the host vehicle based on the rotation direction, the rotation angle, and the center of rotation of the host vehicle.

In another further embodiment, the robustness index may be calculated based on a repair cost of the host vehicle varying depending on a collision position between the host vehicle and the other vehicle. The robustness index may be determined based on a value obtained by dividing an expected repair cost at a specific collision position by a maximum repair cost selected from among expected repair costs at a plurality of collision positions.

In still another further embodiment, the safety index may be calculated based on the degree of damage to the occupant depending on a collision position between the host vehicle and the other vehicle. The safety index may be determined based on a value obtained by dividing an expected degree of damage at a specific collision position depending on the position of the occupant by a maximum degree of damage.

In yet another further embodiment, the autonomous driving controller may calculate, using the robustness index or the safety index, a rotation direction, a rotation angle, and a center of rotation of the host vehicle as data necessary to rotate the host vehicle. When the robustness index is used, the autonomous driving controller may calculate the rotation direction, the rotation angle, and the center of rotation so that collision with the other vehicle occurs at a collision position at which a value of the robustness index is large. When the safety index is used, the autonomous driving controller may calculate the rotation direction, the rotation angle, and the center of rotation so that collision with the other vehicle occurs at a collision position at which a value of the safety index is large.

In still yet another further embodiment, the system may further include a motor controller configured to control driving of a motor mounted to each of wheels of the host vehicle and a brake controller configured to control braking of a brake device mounted to each of the wheels of the host vehicle based on the rotation direction, the rotation angle, and the center of rotation calculated by the autonomous driving controller.

In another aspect, the present disclosure provides a method of reducing damage to an occupant caused by a collision. The method includes detecting, by sensors, movement of another vehicle approaching a host vehicle. The method includes determining, by a controller, the possibility of collision by calculating a collision index indicating the possibility of collision between the host vehicle and the other vehicle. The method includes determining, by the controller, whether an expected collision position calculated based on a heading angle of the other vehicle approaching the host vehicle and the center of the host vehicle corresponds to the position of an occupant of the host vehicle. The method includes calculating, by the controller, data necessary to rotate the host vehicle based on one of a safety index indicating the degree of damage to the occupant depending on the expected collision position and the position of the occupant and a robustness index indicating the degree of damage to the host vehicle depending on the heading angle of the other vehicle and the expected collision position depending on whether the expected collision position and the position of the occupant correspond to each other.

In a embodiment, determining the possibility of collision may include determining whether the collision index is equal to or greater than a first threshold value to determine whether to supply power to components configured to rotate the host vehicle. Determining the possibility of collision may include determining whether the collision index is equal to or greater than a second threshold value to determine whether it is possible to avoid collision between the host vehicle and the other vehicle through rotation control of the host vehicle.

In another embodiment, the collision index may be calculated based on at least one of a speed of the other vehicle, a distance between the host vehicle and the other vehicle, or an expected collision area. The expected collision area may be an area in which a virtual shape indicating the other vehicle overlaps a virtual shape indicating the host vehicle in a state of being moved at the heading angle by a distance between the center of the host vehicle and the other vehicle.

In still another embodiment, determining whether the expected collision position corresponds to the position of the occupant of the host vehicle may include determining whether the occupant is located within the expected collision area.

In yet another embodiment, calculating the data necessary to rotate the host vehicle may be performed based on the safety index when the expected collision position corresponds to the position of the occupant.

In still yet another embodiment, calculating the data necessary to rotate the host vehicle may include calculating, using the robustness index, a rotation direction, a rotation angle, and a center of rotation of the host vehicle as data necessary to rotate the host vehicle when the expected collision position does not correspond to the position of the occupant. Calculating the data necessary to rotate the host vehicle may include determining whether an additional expected collision position corresponds to the position of the occupant. The additional expected collision position may be an expected collision position between the host vehicle and the other vehicle after rotating the host vehicle based on the rotation direction, the rotation angle, and the center of rotation of the host vehicle.

In a further embodiment, the method may include, when the additional expected collision position corresponds to the position of the occupant, not performing rotation control of the host vehicle.

In another further embodiment, the method may include, when the additional expected collision position does not correspond to the position of the occupant, outputting, by the controller. a command to rotate the host vehicle based on the rotation direction, the rotation angle, and the center of rotation of the host vehicle.

In still another further embodiment, the method may further include controlling driving of a motor mounted to each of wheels of the host vehicle and braking of a brake device mounted to each of the wheels of the host vehicle based on the rotation direction, the rotation angle, and the center of rotation of the host vehicle as data necessary to rotate the host vehicle.

Other aspects and embodiments of the disclosure are discussed below.

It should be understood that the terms "vehicle" or "vehicular" or other similar terms as used herein include motor vehicles in general. Such motor vehicles may encompass passenger automobiles including sport utility vehicles (SUV), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example a vehicle that is both gasoline-powered and electric-powered.

The above and other features of the present disclosure are discussed below.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus do not limit the present disclosure, and wherein.

Figure 1:
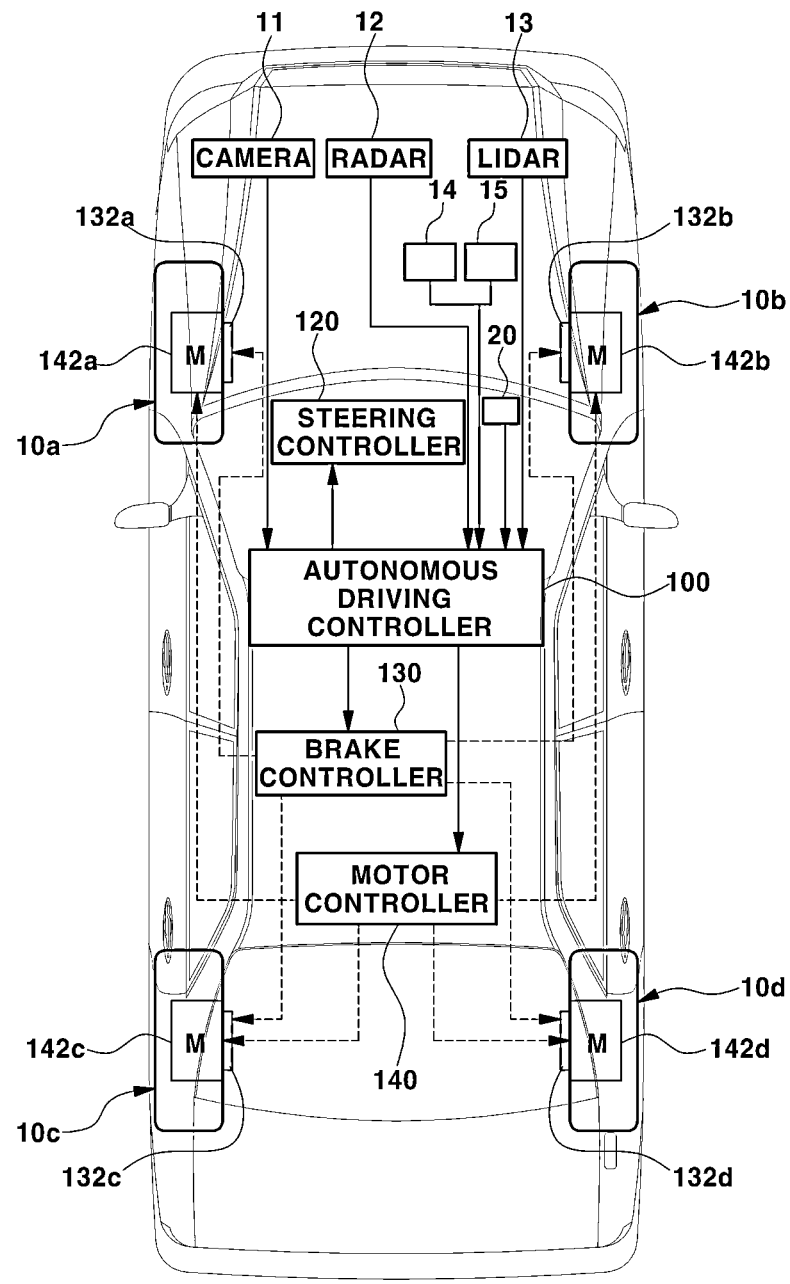
FIG. 1 is a diagram showing components constituting a system for reducing damage to an occupant caused by collision according to an embodiment of the present disclosure.

It should be understood that the appended drawings are not necessarily drawn to scale, presenting a somewhat simplified representation of various features illustrative of the basic principles of the disclosure. The specific design features of the present disclosure as shown and described herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Advantages and features of the present disclosure and methods for achieving the same are made clear from embodiments described below in detail with reference to the accompanying drawings. The present disclosure may, however, be embodied in many different forms and should not be construed as being limited to the embodiments set forth herein. Rather, these embodiments are provided so that the present disclosure may be thorough and complete, and these embodiments fully convey the scope of the present disclosure to those having ordinary skill in the art. The present disclosure is defined only by the scope of the claims.

Throughout the specification, including the drawings, the same reference numerals represent the same or equivalent components.

The terms "-part", "-unit", and "-module" used in the present disclosure mean units for processing at least one function or operation and can be implemented as hardware components, software components, or combinations of hardware components and software components. When a "-part", "-unit", "-module", or the like of the present disclosure is described as having a purpose or performing an operation, function, or the like, the component, device, element, or the like should be considered herein as being "configured to" meet that purpose or to perform that operation or function. Each "-part", "-unit", "-module", and the like may separately embody or be included with a processor and a memory, such as a non-transitory computer readable media, as part of the apparatus.

Further, in the following description, the terms "first" and "second" are used only to avoid confusing designated components and do not indicate the sequence or importance of the components or the relationships between the components.

The detailed description illustrates the technical concepts of the present disclosure. Also, the following description is intended to illustrate and explain the embodiments of the present disclosure. The various features of the present disclosure may be used in various other combinations, modifications, and environments. In other words, the present disclosure may be changed or modified within the scope of the concepts disclosed herein, the scope equivalent to the disclosure, and/or the scope of technology or knowledge in the art. The described embodiments illustrate a state for implementing the technical spirit of the present disclosure, and various changes may be made thereto as being demanded for specific applications and uses of the present disclosure. Accordingly, the following detailed description is not intended to limit the present disclosure to the embodiments disclosed herein. Also, the appended claims should be construed as encompassing such other embodiments.

FIG. 1 is a diagram showing components constituting a system for reducing damage to an occupant caused by collision according to an embodiment of the present disclosure.

Referring to FIG. 1, a vehicle may be equipped with a controller for control of autonomous driving. The controller may include an autonomous driving controller 100. The autonomous driving controller 100 determines and calculates data necessary to control autonomous driving, generates a travel path of the vehicle in real time through calculation based on information about the travel path and the surrounding environment detected by a sensor, and executes a command without intervention by a driver. The controller 100 may further include a steering controller 120, a brake controller 130, and a motor controller 140, which directly control the vehicle based on the data calculated or determined by the autonomous driving controller 100. Each of the autonomous driving controller 100, the steering controller 120, the brake controller 130, and the motor controller 140 may be an electronic control unit (ECU). However, one electronic control unit may perform all of the functions that the autonomous driving controller 100, the steering controller 120, the brake controller 130, and the motor controller 140 perform. Each of the autonomous driving controller 100, the steering controller 120, the brake controller 130, and the motor controller 140 may perform cooperative control.

The autonomous driving controller 100 is configured to receive various data necessary for autonomous driving from autonomous driving sensors mounted in the vehicle, such as a camera 11, a radio detection and ranging (RADAR) device 12, a light imaging detection and ranging (LIDAR) device 13, a yaw rate sensor 14, and an accelerator sensor 15. The autonomous driving controller 100 is configured to perform overall autonomous driving control, such as control of a travel direction, acceleration, and deceleration of the vehicle, based on the received data.

The autonomous driving controller 100 may perform rotation control of the host vehicle in a parked state based on the received data in preparation for collision with another vehicle approaching the host vehicle. In a parked state, the driver may activate the system for reducing damage caused by collision in order to minimize damage to the host vehicle caused by collision. For example, the driver may activate the system for reducing damage caused by collision in a parked state through selection of a menu displayed on an AVN display, through a voice input device, through a dedicated application of a smart device, or through an operation switch located in the vehicle. Other than activation of the system by operation by the driver, the system may be activated when the vehicle is in a parked or stopped state and a determination as to whether another vehicle or an object is present near the host vehicle is made. For example, when there is another vehicle parked near the host vehicle, the system may not be activated due to the possibility of the other vehicle being damaged by rotation control of the host vehicle. However, the conditions under which the system is activated may not be particularly limited and may be determined in advance by a designer.

In an activated state of the system, power for operation may be applied to the autonomous driving sensors, such as the camera 11, the RADAR 12, and the LIDAR 13, and the autonomous driving controller 100. The autonomous driving sensors, such as the camera 11, the RADAR 12, and the LIDAR 13, may monitor movement of another vehicle approaching the host vehicle. The autonomous driving controller 100 may calculate a distance between the host vehicle and the other vehicle, a speed of the other vehicle, and a heading angle at which the other vehicle approaches the host vehicle based on data received from the autonomous driving sensors, such as the camera 11, the RADAR 12, and the LIDAR 13.

The yaw rate sensor 14 and the acceleration sensor 15 may measure data, based on which the autonomous driving controller 100 determines a change in the position of the host vehicle in a rotating state. The autonomous driving controller 100 may receive a yaw rate signal from the yaw rate sensor 14, may receive longitudinal-direction acceleration and lateral-direction acceleration signals from the acceleration sensor 15, and may determine a change in the movement position of the host vehicle that is rotated in preparation for collision with another vehicle.

An internal camera 20 may monitor the presence or absence of an occupant in the host vehicle and the position of the occupant. Data acquired by the internal camera 20 may be transmitted to the autonomous driving controller 100.

The autonomous driving controller 100 may calculate a collision index indicating the possibility of collision between the host vehicle and another vehicle approaching the host vehicle. The autonomous driving controller 100 may calculate a collision index based on at least one of a speed of the other vehicle, a distance between the host vehicle and the other vehicle, or an expected collision area.

In detail, the product of the speed of the other vehicle, the distance between the host vehicle and the other vehicle, and the expected collision area may be the collision index. The distance between the host vehicle and the other vehicle may be a spacing distance between the center of the host vehicle and the other vehicle. The expected collision area may be an area in which a virtual shape indicating the host vehicle and a virtual shape indicating the other vehicle overlap each other based on a heading angle of the other vehicle with respect to a reference direction in which the host vehicle is oriented and based on the position of the center of the host vehicle.

In an example, the center of the host vehicle may be determined in advance based on the length, width, and height of the body of the host vehicle and a distance from the foremost portion of the body of the host vehicle to the center of gravity thereof. In other words, the center of the host vehicle may be the center of gravity thereof or a center calculated based on the length and width of the body of the host vehicle. The autonomous driving controller 100 may calculate a distance between the center of the host vehicle and the other vehicle and a heading angle of the other vehicle using the autonomous driving sensors mounted in the host vehicle, such as the camera 11, the RADAR 12, and the LIDAR 13. The autonomous driving controller 100 may calculate an expected collision area in which a virtual rectangular shape indicating the host vehicle based on the center of the host vehicle and a virtual rectangular shape indicating the other vehicle overlap each other taking into consideration of a heading angle of the other vehicle. In this case, the expected collision area may be an area in which a virtual rectangular shape indicating the host vehicle and a virtual rectangular shape indicating the other vehicle overlap each other.

The autonomous driving controller 100 may continuously calculate the collision index indicating the possibility of collision between the host vehicle and the other vehicle. A large collision index may indicate that the possibility of collision between the host vehicle and the other vehicle is high.

When the collision index is equal to or greater than a first threshold value, the autonomous driving controller 100 may perform control such that power is supplied to components that function to rotate the host vehicle. As such, since power is supplied to the components that function to rotate the host vehicle at an early stage, it is possible to prepare for rotation control of the host vehicle suddenly. The components may include at least one of motors 142a, 142b, 142c, and 142d connected to wheels 10a, 10b, 10c, and 10d to supply driving force thereto, brake devices 132a, 132b, 132c, and 132d configured to control braking of the wheels 10a, 10b, 10c, and 10d, or a steering angle control device configured to control steering angles of the wheels 10a, 10b, 10c, and 10d. In addition, the components may include the brake controller 130 configured to control the brake devices 132a, 132b, 132c, and 132d and the motor controller 140 configured to control the motors 142a, 142b, 142c, and 142d.

When the collision index is equal to or greater than a second threshold value, the autonomous driving controller 100 may determine the relationship between an expected collision position and the position of the occupant and may calculate data necessary to rotate the host vehicle so as to minimize damage to the occupant in the host vehicle or to minimize damage to the host vehicle. When the expected collision position corresponds to the position of the occupant, the autonomous driving controller 100 may calculate data necessary to rotate the host vehicle based on a safety index indicating the degree of damage to the occupant depending on the collision position and the position of the occupant. When the expected collision position does not correspond to the position of the occupant, the autonomous driving controller 100 may calculate data necessary to rotate the host vehicle so as to minimize damage to the host vehicle based on a robustness index indicating the degree of damage to the host vehicle depending on a heading angle of the other vehicle and the collision position. The data necessary to rotate the host vehicle may include a rotation direction, a rotation angle, and a center of rotation of the host vehicle.

The collision index equal to or greater than the second threshold value may indicate a state in which it is impossible to avoid collision with the other vehicle in spite of control of the host vehicle. In other words, the system for reducing damage caused by collision according to the embodiment of the present disclosure may be a system for minimizing damage to an occupant or minimizing damage to the host vehicle caused by collision in a situation in which it is difficult to avoid collision between the host vehicle and another vehicle in spite of control of the host vehicle. In one example, the system for reducing damage caused by collision according to the embodiment of the present disclosure may be a system for minimizing damage to the host vehicle caused by collision while minimizing damage to an occupant in a situation in which there is an occupant in the host vehicle and it is difficult to avoid collision between the host vehicle and another vehicle. The second threshold value may be larger than the first threshold value. The expected collision position of the host vehicle may be determined based on the relationship between the center of the host vehicle and a heading angle of another vehicle.

When the collision index is equal to or greater than a third threshold value and less than the second threshold value, the autonomous driving controller 100 may calculate data necessary to rotate the host vehicle in order to avoid collision between the host vehicle and another vehicle. The third threshold value may be larger than the first threshold value and smaller than the second threshold value. This case may be a case in which avoidance of collision with another vehicle is possible through rotation control of the host vehicle. In other words, this case may be a case of performing control for avoidance of collision itself, rather than performing control for minimization of damage to an occupant or the host vehicle. The autonomous driving controller 100 may consider control for minimization of damage to an occupant. However, upon determining based on the safety index that minimization of damage to an occupant is assured, the autonomous driving controller 100 may calculate data necessary to control the host vehicle so as to minimize damage to the host vehicle. The first threshold value, the second threshold value, and the third threshold value may be fixed values obtained in advance through simulations or real vehicle experiments.

TABLE 1

| | Safety Index (Medium Speed) | | | | |
|---|---|---|---|---|---|
| Collision Type | Driver's Seat | Front Passenger Seat | Rear-Left | Rear-Center | Rear-Right |
| Front-Surface Left Offset Collision | 0.2 | 0.6 | 1 | 1 | 1 |
| Front-Surface Center Collision | 0.4 | 0.4 | 1 | 1 | 1 |
| Front-Surface Right Offset Collision | 0.4 | 0 | 1 | 1 | 1 |
| Rear-Surface Left Offset Collision | 1 | 1 | 0.2 | 0.4 | 0.6 |
| Rear-Surface Center Collision | 1 | 1 | 0.4 | 0.4 | 0.4 |
| Rear-Surface Right Offset Collision | 1 | 1 | 0.6 | 0.4 | 0.2 |
| Left-Surface Front Collision | 0 | 0.8 | 0.4 | 0.6 | 0.8 |
| Left-Surface Center Collision | 0 | 0.8 | 0 | 0.4 | 0.8 |
| Left-Surface Rear Collision | 0.4 | 1 | 0 | 0.2 | 0.6 |
| Right-Surface Front Collision | 0.4 | 0 | 0.8 | 0.6 | 0.4 |
| Right-Surface Center Collision | 0.8 | 0 | 0.8 | 0.4 | 0 |
| Right-Surface Rear Collision | 0.8 | 0.4 | 0.6 | 0.8 | 0 |

TABLE 2

| | Safety Index (High Speed) | | | | |
|---|---|---|---|---|---|
| Collision Type | Driver's Seat | Front Passenger Seat | Rear-Left | Rear-Center | Rear-Right |
| Front-Surface Left Offset Collision | 0.30 | 0.70 | 0.83 | 0.83 | 0.83 |
| Front-Surface Center Collision | 0.53 | 0.53 | 0.83 | 0.83 | 0.83 |
| Front-Surface Right Offset Collision | 0.53 | 0.00 | 0.83 | 0.83 | 0.83 |
| Rear-Surface Left Offset Collision | 0.83 | 0.83 | 0.30 | 0.53 | 0.70 |
| Rear-Surface Center Collision | 0.83 | 0.83 | 0.53 | 0.53 | 0.53 |
| Rear-Surface Right Offset Collision | 0.83 | 0.83 | 0.70 | 0.53 | 0.30 |
| Left-Surface Front Collision | 0.00 | 0.80 | 0.53 | 0.70 | 0.80 |
| Left-Surface Center Collision | 0.00 | 0.80 | 0.00 | 0.53 | 0.80 |
| Left-Surface Rear Collision | 0.53 | 0.83 | 0.00 | 0.30 | 0.70 |
| Right-Surface Front Collision | 0.53 | 0.00 | 0.83 | 0.70 | 0.53 |
| Right-Surface Center Collision | 0.80 | 0.00 | 0.80 | 0.53 | 0.00 |
| Right-Surface Rear Collision | 0.80 | 0.30 | 0.70 | 0.80 | 0.00 |

TABLE 3

| Collision Type | Robustness Index (Medium Speed) | Robustness Index (High Speed) |
|---|---|---|
| Front-Surface Left Offset Collision | 0.25 | 0.4 |
| Front-Surface Center Collision | 0.375 | 0.5 |
| Front-Surface Right Offset Collision | 0.25 | 0.4 |
| Rear-Surface Left Offset Collision | 0.5 | 0.6 |
| Rear-Surface Center Collision | 0.625 | 0.7 |
| Rear-Surface Right Offset Collision | 0.5 | 0.6 |
| Left-Surface Front Collision | 0 | 0 |
| Left-Surface Center Collision | 0.125 | 0.15 |
| Left-Surface Rear Collision | 0.25 | 0.4 |
| Right-Surface Front Collision | 0.25 | 0.4 |
| Right-Surface Center Collision | 0.25 | 0.4 |
| Right-Surface Rear Collision | 0.5 | 0.6 |

Values in Table 1 may be illustrative of safety indices indicating the degree of damage to an occupant depending on a collision position and a position of an occupant when another vehicle approaches the host vehicle at medium speed. Values in Table 2 may indicate safety indices indicating the degree of damage to an occupant depending on a collision position and a position of an occupant when another vehicle approaches the host vehicle at high speed. Values in Table 3 may indicate robustness indices indicating the degree of damage to the host vehicle depending on a heading angle of another vehicle and a collision position of the host vehicle. The safety index and the robustness index of a vehicle may be calculated using results of collision tests during the development stage of the vehicle. For example, the collision type of a vehicle may be classified, depending on a collision position, into a total of twelve types, such as front-surface left offset collision, front-surface center collision, front-surface right offset collision, rear-surface left offset collision, rear-surface center collision, rear-surface right offset collision, left-surface front collision, left-surface center collision, left-surface rear collision, right-surface front collision, right-surface center collision, and right-surface rear collision. Among the positions of an occupant, "rear-left" may be a left side of a second-row seat based on the reference direction of the host vehicle, "rear-center" may be a center of the second-row seat based on the reference direction of the host vehicle, and "rear-right" may be a right side of the second-row seat based on the reference direction of the host vehicle. The safety index and the robustness index may be stored in the autonomous driving controller 100, a separate processor or a memory.

In an example, the safety index may be a numerical value calculated based on the degree of damage to an occupant caused by collision. The safety index may be calculated as follows.

Safety Index=1−(Expected Degree of Damage/Maximum Degree of Damage)

The safety index may be determined based on a value obtained by dividing an expected degree of damage to an occupant at a specific collision position depending on the position of the occupant by a maximum degree of damage to the occupant. When the position of the occupant is a driver's seat, rear-surface center collision may cause a minimum degree of damage to the occupant, and thus the safety index corresponding to this case may be 1. When the position of the occupant is a driver's seat, left-surface center collision may cause a maximum degree of damage to the occupant, and thus the safety index corresponding to this case may be 0.

In an example, the robustness index may be a numerical value calculated based on a cost required to repair the damaged part of the vehicle due to collision. In this case, the robustness index may be calculated as follows.

Robustness Index=1−(Expected Repair Cost/Maximum Repair Cost)

The robustness index may be determined based on a value obtained by dividing an expected repair cost at a specific collision position by a maximum repair cost selected from among expected repair costs at a plurality of collision positions. It is experimentally verified that a repair cost due to left-surface front collision is the highest. Therefore, the robustness index corresponding to left-surface front collision may be 0.

In addition, the safety index determined based on the degree of damage to an occupant and the robustness index determined based on the repair cost of the vehicle may vary depending on a speed of another vehicle approaching the host vehicle. The safety index and the robustness index when the speed of the other vehicle is a medium speed and the safety index and the robustness index when the speed of the other vehicle is a high speed may be separately stored. For example, when the speed of the other vehicle is a medium speed, the robustness index corresponding to front-surface left offset collision and the robustness index corresponding to front-surface right offset collision may be identical to each other. However, when the speed of the other vehicle is a high speed, the robustness index corresponding to front-surface left offset collision may be greater than the robustness index corresponding to front-surface right offset collision. In other words, the safety index and the robustness index when the speed of the other vehicle is a medium speed and the safety index and the robustness index when the speed of the other vehicle is a high speed may differ from each other, and a relationship in magnitude between the safety indices and a relationship in magnitude between the robustness indices in two specific cases may vary depending on the speed of the other vehicle. Therefore, the autonomous driving controller 100 may determine, based on the speed of the other vehicle, a safety index or a robustness index that is applied to calculation of data necessary to rotate the host vehicle.

The autonomous driving controller 100 may calculate the rotation direction and the rotation angle of the host vehicle based on one of the safety index and the robustness index, the center of the host vehicle, and the heading angle of the other vehicle. The autonomous driving controller 100 may calculate the rotation direction and the rotation angle of the host vehicle so that collision with the other vehicle occurs at a collision position at which the value of the safety index or the robustness index is large. The host vehicle may be rotated up to 90 degrees in each of the leftward and rightward directions. Limiting the rotation angle of the host vehicle may be intended to ensure reliability of rotation control of the host vehicle. In other words, when the possibility of collision between the host vehicle and the other vehicle is high, it takes a lot of time to control the host vehicle such that the host vehicle is rotated 90 degrees or more. Therefore, the rotation angle of the host vehicle may be limited to less than 90 degrees so that rotation of the host vehicle to the calculated rotation angle is completed before collision. The autonomous driving controller 100 may determine an expected collision position of the host vehicle based on the center of the host vehicle and the heading angle of the other vehicle. The autonomous driving controller 100 may calculate the rotation direction of the host vehicle based on an expected collision position of the host vehicle and the safety index corresponding thereto in order to control the host vehicle such that collision with the other vehicle occurs at a collision position capable of minimizing the degree of damage to an occupant. The autonomous driving controller 100 may calculate the rotation direction of the host vehicle based on an expected collision position of the host vehicle and the robustness index corresponding thereto in order to control the host vehicle such that collision with the other vehicle occurs at a collision position capable of minimizing the degree of damage to the host vehicle.

The autonomous driving controller 100 may use the heading angle of the other vehicle and one of the safety index and the robustness index to calculate the rotation direction. The autonomous driving controller 100 may calculate the rotation angle of the host vehicle based on the reference direction that is oriented from the rear to the front of the host vehicle, the heading angle of the other vehicle, and one of the safety index and the robustness index. For example, when the occupant is located in the driver's seat and frontal collision of the host vehicle is expected, it may be determined based on the robustness index that right-surface center collision or right-surface rear collision causes minimum damage to the host vehicle. Therefore, the autonomous driving controller 100 may calculate the heading angle of the other vehicle as the rotation angle in order to induce right-surface center collision or right-surface rear collision of the host vehicle. In this case, the heading angle of the other vehicle may be determined based on the reference angle of the host vehicle.

The autonomous driving controller 100 may determine the center of rotation of the host vehicle taking into consideration the center of the host vehicle, the heading angle of the other vehicle, the rotation direction, and one of the safety index and the robustness index. The autonomous driving controller 100 may determine one of the four wheels 10a, 10b, 10c, and 10d of the host vehicle to be the center of rotation or may determine the center of the host vehicle to be the center of rotation. The autonomous driving controller 100 may determine the center of rotation about which the host vehicle is rotated in a direction away from the other vehicle in order to minimize damage to the occupant. The collision position of the host vehicle may vary depending on the center of rotation.

In an example, the autonomous driving controller 100 may determine one of the four wheels 10a, 10b, 10c, and 10d of the host vehicle to be the center of rotation in order to rotate the host vehicle in a direction away from the other vehicle. In this case, the determined wheel may be a wheel required to be braked. The wheel required to be braked may be a wheel that is braked at the time of commencement of rotation control of the host vehicle. The autonomous driving controller 100 may select a wheel required to be braked and a wheel required to be driven from among the wheels 10a, 10b, 10c, and 10d taking into consideration the center of rotation, the rotation angle, and the rotation direction. A wheel disposed on the same side as the determined wheel, among the left and right sides of the host vehicle based on the reference direction that is oriented from the rear to the front of the host vehicle, may be a wheel that does not require braking or driving. In other words, a wheel disposed on the same side as the determined wheel, among the left and right sides of the host vehicle based on the reference direction that is oriented from the rear to the front of the host vehicle, may be kept stationary. Wheels disposed on the side opposite the determined wheel, among the left and right sides of the host vehicle, may be wheels required to be driven. The wheels required to be driven may be wheels that are driven at the time of commencement of rotation control of the host vehicle.

In another example, when the center of rotation is the center of the host vehicle, all of the wheels 10a, 10b, 10c, and 10d may be wheels required to be driven.

The autonomous driving controller 100 may determine whether to drive each of the wheels required to be driven in the forward direction or the backward direction. When the center of rotation is one of the wheels 10a, 10b, 10c, and 10d and rear collision of the host vehicle is expected, the autonomous driving controller 100 may perform control such that wheels required to be driven are driven in the forward direction. When the center of rotation is one of the wheels 10a, 10b, 10c, and 10d and frontal collision of the host vehicle is expected, the autonomous driving controller 100 may perform control such that wheels required to be driven are driven in the backward direction. When the center of rotation is the center of the host vehicle, the driving direction of the left wheels 10a and 10c and the driving direction of the right wheels 10b and 10d may be opposite each other and may vary depending on the rotation direction.

The autonomous driving controller 100 may calculate driving torque applied to each of the wheels required to be driven. In an example, the autonomous driving controller 100 may determine a maximum value of driving torque applied to each of the wheels required to be driven. In another example, the autonomous driving controller 100 may calculate driving torque applied to each of the wheels required to be driven based on the rotation angle of the host vehicle.

The autonomous driving controller 100 may calculate braking torque applied to each of the wheels required to be braked. In an example, the autonomous driving controller 100 may determine a maximum value of braking torque applied to each of the wheels required to be braked. In another example, the autonomous driving controller 100 may calculate braking torque applied to each of the wheels required to be braked based on the rotation angle of the host vehicle.

The autonomous driving controller 100 may determine a steering direction. When the host vehicle is rotated by backward driving, the steering direction may be determined to be a direction opposite a target rotation direction of the host vehicle. When the host vehicle is rotated by forward driving, the steering direction may be determined to be the same direction as the target rotation direction of the host vehicle. In order to achieve quick rotation of the host vehicle, the autonomous driving controller 100 may determine a maximum value of a steering angle.

In order to control rotation of the host vehicle, the autonomous driving controller 100 may transmit a steering angle signal and a steering direction signal to the steering controller 120, may transmit information about the wheel required to be braked and a braking torque signal to the brake controller 130, and may transmit information about the wheel required to be driven and a driving torque signal to the motor controller 140.

The steering controller 120 may be basically configured to perform steering control in response to a steering intention according to autonomous driving logic of the autonomous driving controller 100 or a steering intention according to steering wheel operation by the driver. In addition, the steering controller 120 may perform steering control for avoidance of collision in response to a signal for rotation of the host vehicle in preparation for collision with the other vehicle.

The brake controller 130 may selectively apply braking torque to the brake devices 132a, 132b, 132c, and 132d mounted to the respective wheels according to a wheel required to be braked and in response to a braking torque signal. The brake controller 130 may be an integrated electric brake (IEB) controller that includes an electronic stability control (ESC) device for vehicle dynamic control.

The motor controller 140 may basically apply driving torque for travel to the motors 142a, 142b, 142c, and 142d mounted to the respective wheels 10a, 10b, 10c, and 10d of the host vehicle. The motor controller 140 may control forward or backward movement of the driving wheels based on information received from the autonomous driving controller 100. The motors 142a, 142b, 142c, and 142d may be in-wheel motors (IWMs). Therefore, forward or backward movement of each of the wheels 10a, 10b, 10c, and 10d may be individually performed by a corresponding one of the motors 142a, 142b, 142c, and 142d, and the driving torque or the braking torque applied to each of the motors 142a, 142b, 142c, and 142d may be different from that applied to the other motors.

According to the embodiment of the present disclosure, the host vehicle in a turned-off state may determine the possibility of collision with another vehicle by itself based on the safety index or the robustness index and may determine whether to perform rotation control thereof by itself. Thus, damage to an occupant caused by collision with another vehicle may be minimized when there is an occupant in the host vehicle in a parked state.

According to the embodiment of the present disclosure, a determination as to whether the position of an occupant corresponds to an expected collision position is made, and rotation control of the host vehicle is performed based on the safety index, whereby damage to the occupant may be minimized. In addition, when the position of the occupant does not correspond to an expected collision position, rotation control of the host vehicle is performed based on the robustness index. Thus, damage to the host vehicle caused by collision may be minimized.

Figure 2:
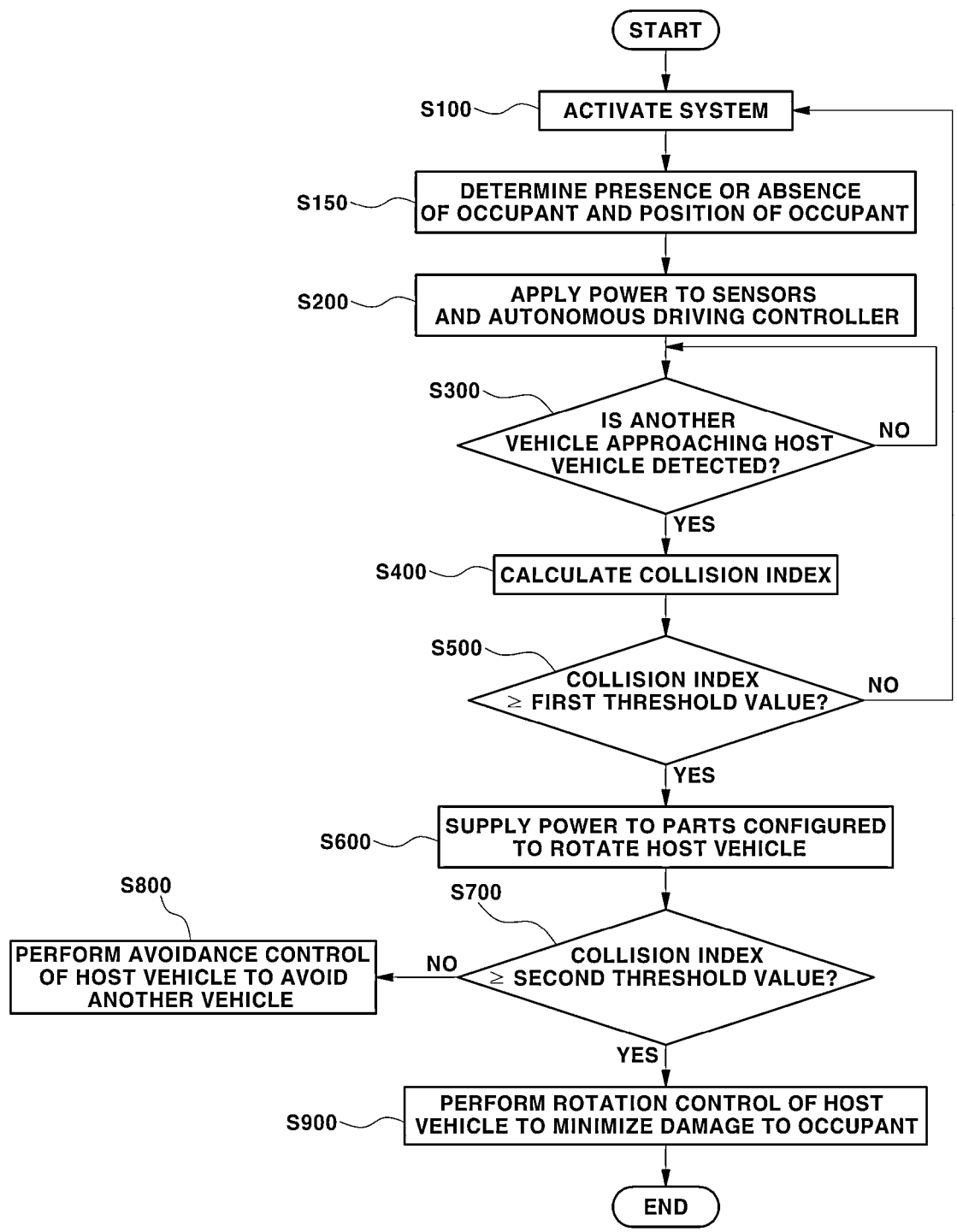
FIG. 2 is a flowchart showing a method of activating rotation control of a host vehicle by the system for reducing damage to an occupant caused by collision according to an embodiment of the present disclosure.

FIG. 2 is a flowchart showing a method of activating rotation control of a host vehicle by the system for reducing damage to an occupant caused by collision according to an embodiment of the present disclosure. For simplicity of description, a duplicate description of the same configurations as those described above will be omitted.

Referring to FIGS. 1 and 2, the system for reducing damage to an occupant caused by collision may be activated by operation of the driver. In addition, in order to activate the system in a turned-off state of the host vehicle, it may be required to determine whether activation of the system is possible by determining whether the host vehicle is in a parked or stopped state or whether another vehicle or an object is present near the host vehicle (S100).

After the system is activated, the presence or absence of an occupant and the position of an occupant in the host vehicle may be monitored using the internal camera 20 mounted in the host vehicle. When an occupant is present in the host vehicle, the autonomous driving controller 100 may perform rotation control of the host vehicle taking into consideration the safety index. However, when there is no occupant in the host vehicle, the autonomous driving controller 100 may perform rotation control of the host vehicle considering only the robustness index without considering the safety index (S150).

When the system is activated, power for operation may be applied to the autonomous driving sensors, such as the camera 11, the RADAR 12, and the LIDAR 13, and the autonomous driving controller 100 (S200).

The autonomous driving sensors may detect whether another vehicle is approaching the host vehicle in real time (S300). Upon determining that movement of another vehicle that is likely to approach the host vehicle has been detected, the autonomous driving controller 100 may control the autonomous driving sensors to monitor movement of the other vehicle in a high-speed sampling mode (at time intervals shorter than those in a reference sampling mode). For example, upon determining that movement of another vehicle that is likely to approach the host vehicle has been detected, the autonomous driving controller 100 may control the autonomous driving sensors to monitor movement of the other vehicle in a high-speed sampling mode (at time intervals shorter than those in the reference sampling mode) to acquire data on the movement of the other vehicle at very short time intervals. On the other hand, when movement of another vehicle is not detected or when movement of another vehicle is stopped and thus the movement of the other vehicle is not detected for a predetermined amount of time, the autonomous driving controller 100 may control the autonomous driving sensors to monitor information about another vehicle and an object present near the host vehicle in a low-speed sampling mode (at time intervals longer than those in the reference sampling mode) in order to prevent discharge of a battery due to operation of the autonomous driving sensors (S300).

When the autonomous driving sensors detect that the other vehicle is approaching the host vehicle in real time (NO in S300), the autonomous driving controller 100 may calculate a collision index based on the data acquired by the autonomous driving sensors (S400). The collision index may be calculated as a product of a speed of the other vehicle approaching the host vehicle, a distance between the host vehicle and the other vehicle, and an expected collision area between the host vehicle and the other vehicle. The speed of the other vehicle and the distance between the host vehicle and the other vehicle may be values detected by the autonomous driving sensors. The expected collision area may be determined differently depending on specifications of the host vehicle, such as the length, width, and height of the body of the host vehicle and a distance from the foremost portion of the body of the host vehicle to the center of gravity (CG) thereof, a distance from the center of gravity of the host vehicle to the other vehicle, and a heading angle of the other vehicle (S400).

The autonomous driving controller 100 may determine whether the collision index is equal to or greater than a first threshold value (S500). A case in which the collision index is less than the first threshold value may be a case in which the possibility of collision between the host vehicle and the other vehicle approaching the host vehicle is low and thus control of the host vehicle is not required. When the collision index is less than the first threshold value (NO in S500), the autonomous driving controller 100 may determine whether the activated state of the system is maintained or released. Upon determining that the activated state of the system is maintained, the autonomous driving controller 100 may again perform the process of detecting the other vehicle approaching the host vehicle. Upon determining that the activated state of the system has been released, the autonomous driving controller 100 may not perform the process of detecting the other vehicle approaching the host vehicle (S500).

When the collision index is equal to or greater than the first threshold value (YES in S500), the autonomous driving controller 100 may perform control such that power is supplied to components that function to rotate the host vehicle (S600). As such, since power is supplied to the components that function to rotate the host vehicle at an early stage, it is possible to prepare for rotation control of the host vehicle suddenly (S600).

The autonomous driving controller 100 may determine whether the collision index is equal to or greater than a second threshold value (S700). When the collision index is less than the second threshold value (NO in S700), the autonomous driving controller 100 may control the host vehicle in order to avoid the other vehicle, rather than controlling the host vehicle in preparation for collision with the other vehicle (S800). In detail, the autonomous driving controller 100 may additionally determine whether the collision index is equal to or greater than a third threshold value. The autonomous driving controller 100 may perform avoidance control of the host vehicle in order to avoid the other vehicle upon determining that the collision index is equal to or greater than the third threshold value and less than the second threshold value. The third threshold value may be a value that is smaller than the second threshold value and larger than the first threshold value.

When the collision index is equal to or greater than the second threshold value (YES in S700), the autonomous driving controller 100 may perform rotation control of the host vehicle in order to minimize damage to the occupant in the host vehicle (S900).

Figure 3:
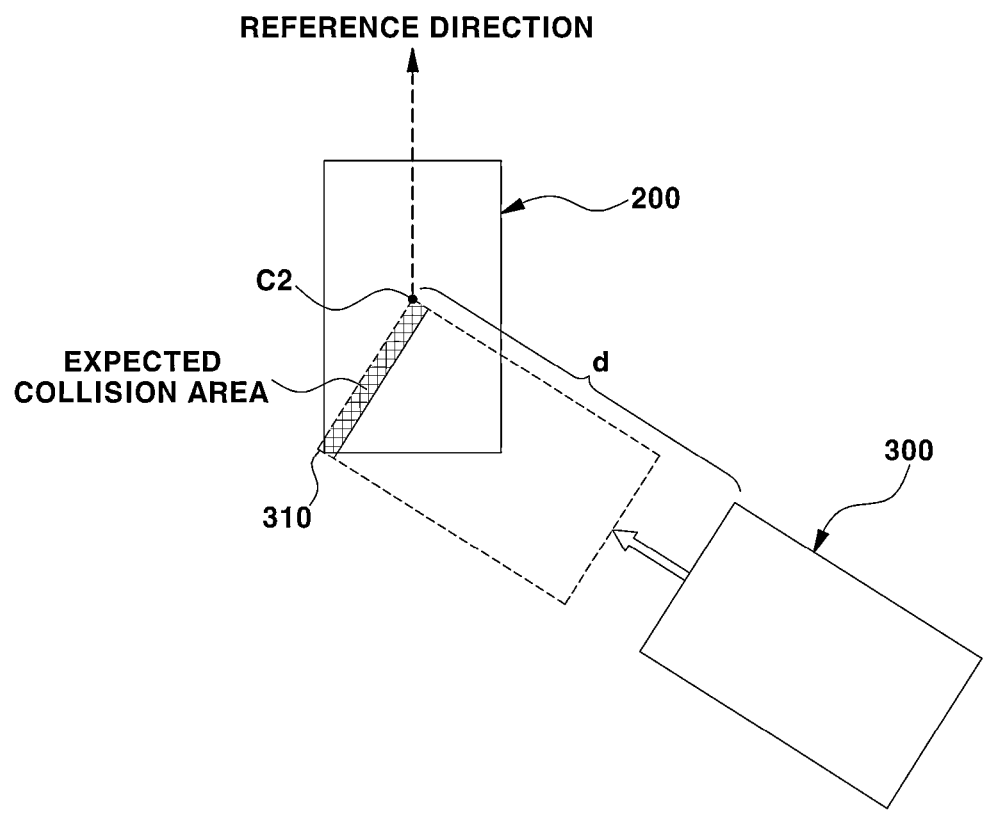
FIG. 3 is a diagram showing a method of determining whether an expected collision position corresponds to a position of an occupant according to an embodiment of the present disclosure.

FIG. 3 is a diagram showing a method of determining whether the expected collision position corresponds to the position of an occupant according to an embodiment of the present disclosure.

Referring to FIGS. 1 and 3, the autonomous driving controller 100 may calculate the expected collision area in order to obtain the collision index. In order to calculate the expected collision area, the autonomous driving controller 100 may determine the center C2 of the host vehicle, the heading angle of the other vehicle approaching the host vehicle, and the distance d between the center C2 of the host vehicle and the other vehicle. The expected collision area may be an area in which a virtual shape 300 indicating the other vehicle overlaps a virtual shape 200 indicating the host vehicle in a state of being moved at the heading angle by the distance d between the center C2 of the host vehicle and the other vehicle. In this case, the virtual shape 200 indicating the host vehicle may be obtained based on the center C2 of the host vehicle determined based on the length, width, and height of the body of the host vehicle and the distance from the foremost portion of the body of the host vehicle to the center of gravity thereof. In addition, the virtual shape 300 indicating the other vehicle may be obtained based on information about the external appearance of the other vehicle acquired through the camera 11, the RADAR 12, and the LIDAR 13 mounted in the host vehicle. However, the virtual shape 300 indicating the other vehicle may be a shape determined in advance or may be set to have the same size as the virtual shape 200 indicating the host vehicle. For example, the virtual shape may be a rectangular shape, without being limited thereto.

In an example, the expected collision area may be an area in which the virtual shape 200 indicating the host vehicle and a front surface portion 310 of the virtual shape 300 indicating the other vehicle overlap each other in the state in which the virtual shape 300 indicating the other vehicle is moved at the heading angle by the distance d between the center C2 of the host vehicle and the other vehicle. The front surface portion 310 of the virtual shape 300 indicating the other vehicle may be an area determined in advance by a designer.

In another example, an area in which the virtual shape 200 indicating the host vehicle and the virtual shape 300 indicating the other vehicle overlap each other in the state in which the virtual shape 300 indicating the other vehicle is moved at the heading angle by the distance d between the center C2 of the host vehicle and the other vehicle may be obtained. An area obtained by multiplying the longest side of the overlapping area by the predetermined height of the body of the host vehicle may be defined as the expected collision area.

The autonomous driving controller 100 may use the expected collision area in order to determine whether the expected collision position and the position of the occupant correspond to each other. When the occupant is located within the expected collision area, the autonomous driving controller 100 may determine that the expected collision position and the position of the occupant correspond to each other. For example, in FIG. 3, when the occupant is located at the rear-center position or the rear-right position, the autonomous driving controller 100 may determine that the expected collision position and the position of the occupant correspond to each other. However, when the occupant is located in the driver's seat, the autonomous driving controller 100 may determine that the expected collision position and the position of the occupant do not correspond to each other.

Unlike the example described above, the corresponding relationship between the expected collision position and the position of the occupant may be determined based on the center C2 of the host vehicle and the heading angle of the other vehicle. The heading angle of the other vehicle may be determined based on the reference direction of the host vehicle. For example, when the heading angle of the other vehicle is 180 degrees with respect to the reference direction of the host vehicle, i.e., when the other vehicle approaches the front surface of the host vehicle, if the occupant is located in the driver's seat or the front passenger seat, it may be determined that the expected collision position and the position of the occupant correspond to each other. For example, as shown in FIG. 3, when the heading angle of the other vehicle is an acute angle with respect to the reference direction of the host vehicle, rear collision is expected. In this case, if the occupant is located in the driver's seat or the front passenger seat, it may be determined that the expected collision position and the position of the occupant do not correspond to each other.

Figure 4:
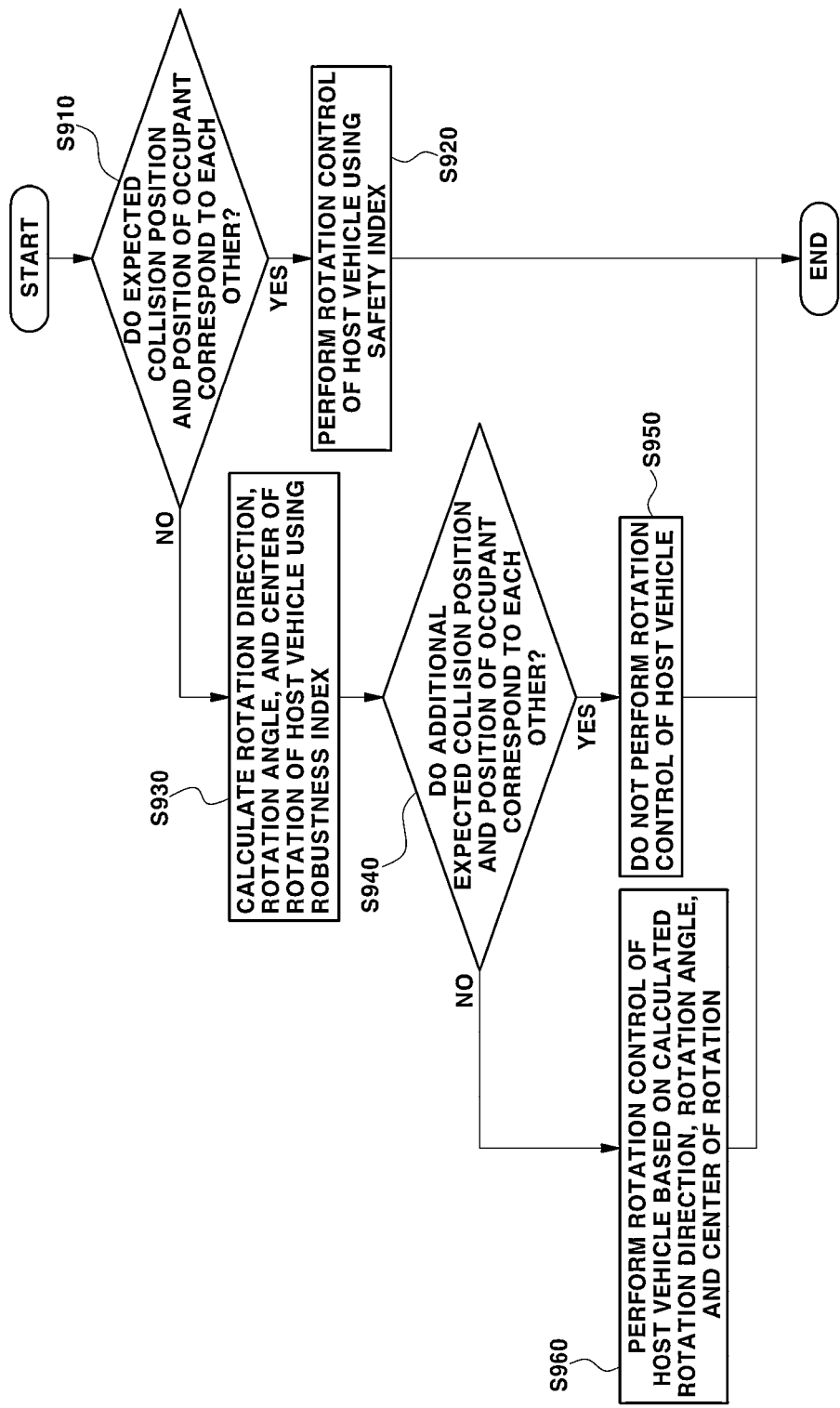
FIG. 4 is a flowchart showing a method of determining which of a robustness index and a safety index is to be used depending on whether the expected collision position and the position of the occupant correspond to each other according to an embodiment of the present disclosure.
Figure 5:
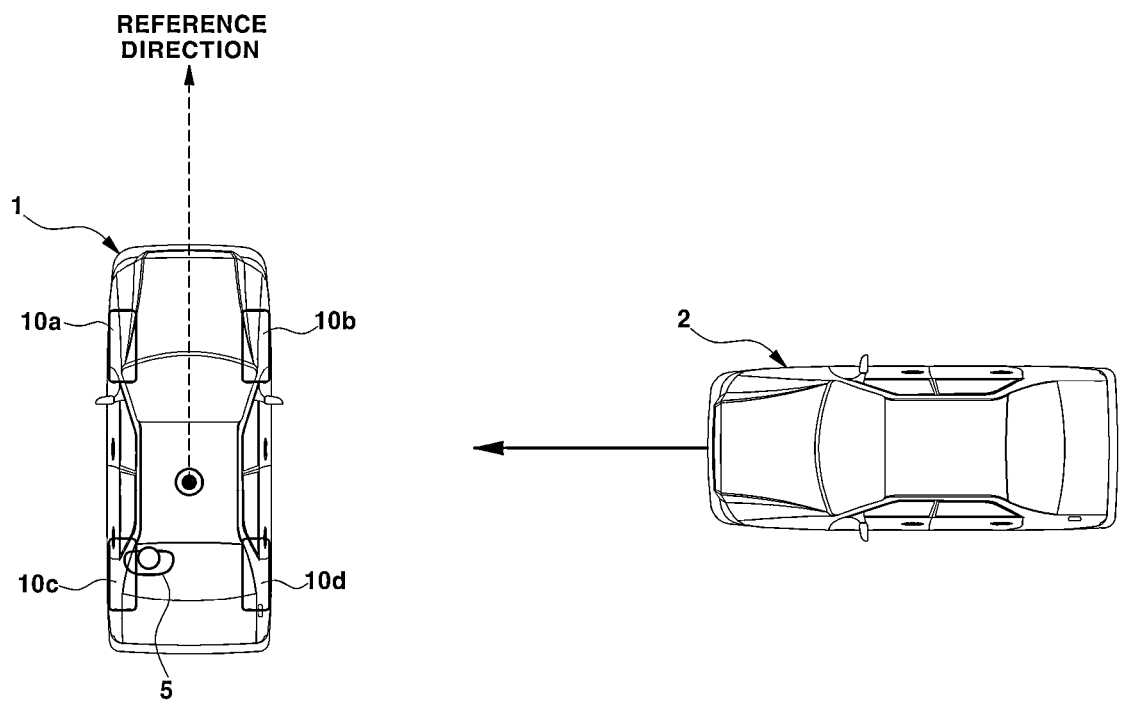
FIG. 5 is a diagram showing a case in which rotation control of the host vehicle according to the embodiment of the present disclosure is not performed.

FIG. 4 is a flowchart showing a method of determining which of the robustness index and the safety index is to be used depending on whether the expected collision position and the position of the occupant correspond to each other according to an embodiment of the present disclosure. FIG. 5 is a diagram showing a case in which rotation control of the host vehicle according to the embodiment of the present disclosure is not performed.

Referring to FIGS. 1 and 4, when the collision index is equal to or greater than the second threshold value, the autonomous driving controller 100 may determine whether the expected collision position and the position of the occupant correspond to each other. The collision index equal to or greater than the second threshold value may indicate a state in which it is impossible to avoid collision with the other vehicle in spite of control of the host vehicle. Therefore, the autonomous driving controller 100 may determine whether the occupant is located at the expected collision position in order to minimize damage to the occupant (S910).

When the expected collision position and the position of the occupant correspond to each other (YES in S910), the autonomous driving controller 100 may perform rotation control of the host vehicle using the safety index (S920). The autonomous driving controller 100 may calculate the rotation direction, the rotation angle, and the center of rotation of the host vehicle so that collision with the other vehicle occurs at a collision position at which the value of the safety index is large. The autonomous driving controller 100 may use the safety index, the center of the host vehicle, and the heading angle of the other vehicle in order to calculate the rotation direction, the rotation angle, and the center of rotation. The autonomous driving controller 100 may transmit the calculated data to the brake controller 130 and the motor controller 140 in order to control motors and brake devices mounted in the host vehicle based on the calculated rotation direction, rotation angle, and center of rotation. In addition, the autonomous driving controller 100 may transmit information about a steering direction and a steering angle to the steering controller 120. In other words, the autonomous driving controller 100, the steering controller 120, the brake controller 130, and the motor controller 140 may perform cooperative control (S920).

When the expected collision position and the position of the occupant do not correspond to each other (NO in S910), the autonomous driving controller 100 may calculate the rotation direction, the rotation angle, and the center of rotation of the host vehicle using the robustness index (S930). When the expected collision position and the position of the occupant do not correspond to each other, the autonomous driving controller 100 may determine that the degree of damage to the occupant caused by collision is not large and may commence the data calculation process using the robustness index (S930).

The autonomous driving controller 100 may predict an additional expected collision position, which is an expected collision position between the host vehicle and the other vehicle after rotating the host vehicle based on the calculated rotation direction, rotation angle, and center of rotation. The autonomous driving controller 100 may determine whether the additional expected collision position and the position of the occupant correspond to each other (S940).

When the additional expected collision position and the position of the occupant correspond to each other (YES in S940), the autonomous driving controller 100 may not perform rotation control of the host vehicle (S950). Through determination as to whether the additional expected collision position and the position of the occupant correspond to each other, the autonomous driving controller 100 may determine that the degree of damage to the occupant caused by collision is not minimized if the autonomous driving controller 100 performs rotation control of the host vehicle using the robustness index in order to minimize damage to the host vehicle. The autonomous driving controller 100 may determine that the degree of damage to the occupant is minimized because the position of the occupant and an initial expected collision position do not correspond to each other if not performing rotation control of the host vehicle. Therefore, the autonomous driving controller 100 may not perform rotation control of the host vehicle, and the steering controller 120, the brake controller 130, and the motor controller 140 may not control the steering device, the motors 142a, 142b, 142c, and 142d, and the brake devices 132a, 132b, 132c, and 132d under the control of the autonomous driving controller 100 (S950).

FIG. 5 is a diagram showing a case in which the other vehicle is approaching the right surface of the host vehicle. Referring to FIG. 5, the autonomous driving controller 100 may calculate the expected collision position and the expected collision area taking into consideration the reference direction of the host vehicle and the heading angle of the other vehicle. The autonomous driving controller 100 may confirm, using the internal camera 20, that the occupant 5 is located at the rear-left position. The autonomous driving controller 100 may determine that the position of the occupant 5 and the expected collision position do not correspond to each other (NO in S950). Therefore, the autonomous driving controller 100 may calculate the rotation direction, the rotation angle, and the center of rotation of the host vehicle using the robustness index, rather than the safety index (S960). In the case of rear-surface center collision of the host vehicle, the robustness index may have the largest value. Therefore, the autonomous driving controller 100 may calculate the rotation direction, the rotation angle, and the center of rotation so that the other vehicle collides with the center portion of the rear surface of the host vehicle. The autonomous driving controller 100 may calculate an additional expected collision position after rotating the host vehicle based on the calculated rotation direction, rotation angle, and center of rotation and may determine whether the additional expected collision position corresponds to the position of the occupant. Since the occupant is located at the rear-left position, the expected collision position due to rear-surface center collision and the position of the occupant may correspond to each other. Therefore, the autonomous driving controller 100 may not perform rotation control of the host vehicle in order to minimize the degree of damage to the occupant because the additional expected collision position and the position of the occupant correspond to each other.

When the additional expected collision position and the position of the occupant do not correspond to each other (NO in S950), the autonomous driving controller 100 may transmit, to the steering controller 120, the brake controller 130, and the motor controller 140, commands to perform rotation control of the host vehicle based on the calculated rotation direction, rotation angle, and center of rotation (S960). The steering controller 120, the brake controller 130, and the motor controller 140 may control the steering device, the motors 142a, 142b, 142c, and 142d, and the brake devices 132a, 132b, 132c, and 132d based on the received data. In other words, when the initial expected collision position and the position of the occupant do not correspond to each other and the additional expected collision position and the position of the occupant do not correspond to each other, both minimization of damage to the occupant and minimization of damage to the host vehicle may be achieved through rotation control of the host vehicle (S960).

According to the embodiment of the present disclosure, it is possible to calculate data for minimization of damage to the occupant caused by collision as well as minimization of damage to the host vehicle caused by collision by determining the corresponding relationship between the initial expected collision position, the additional expected collision position after rotation control, and the position of the occupant.

Figure 6:
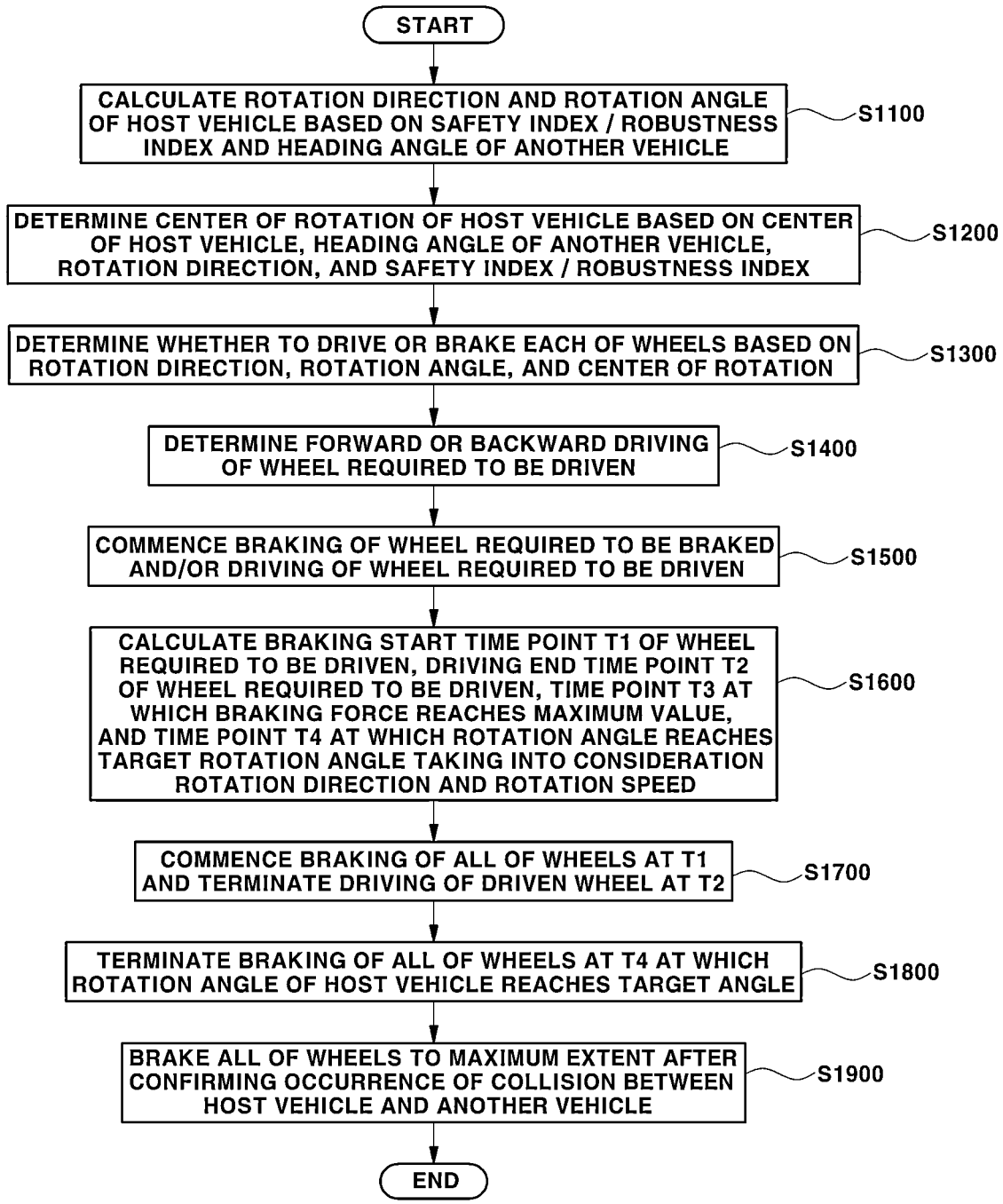
FIG. 6 is a flowchart showing a method of performing rotation control of the host vehicle according to an embodiment of the present disclosure.
Figure 7:
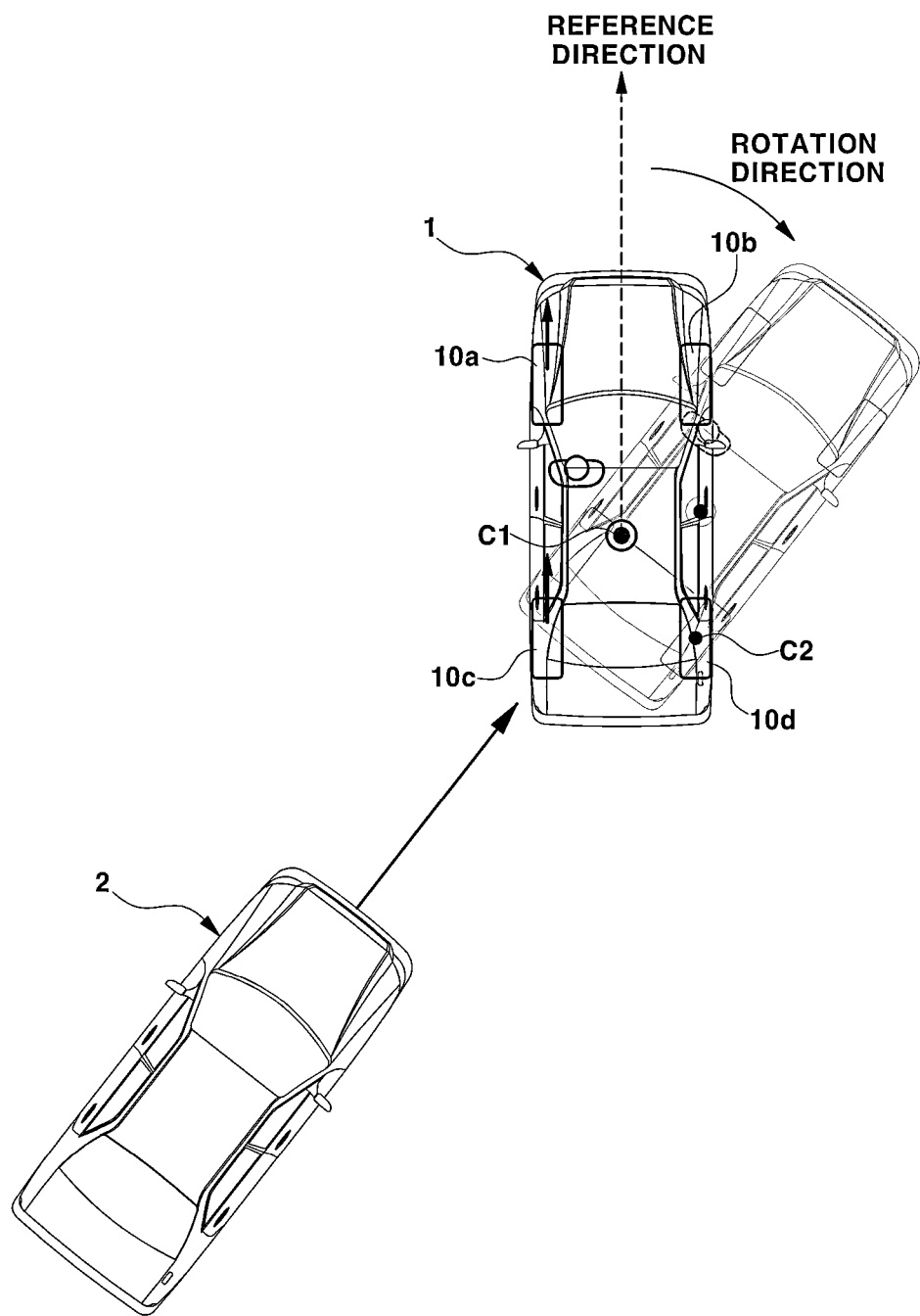
FIGS. 7 and 8 are diagrams showing examples of rotation control of the host vehicle according to an embodiment of the present disclosure.
Figure 8:
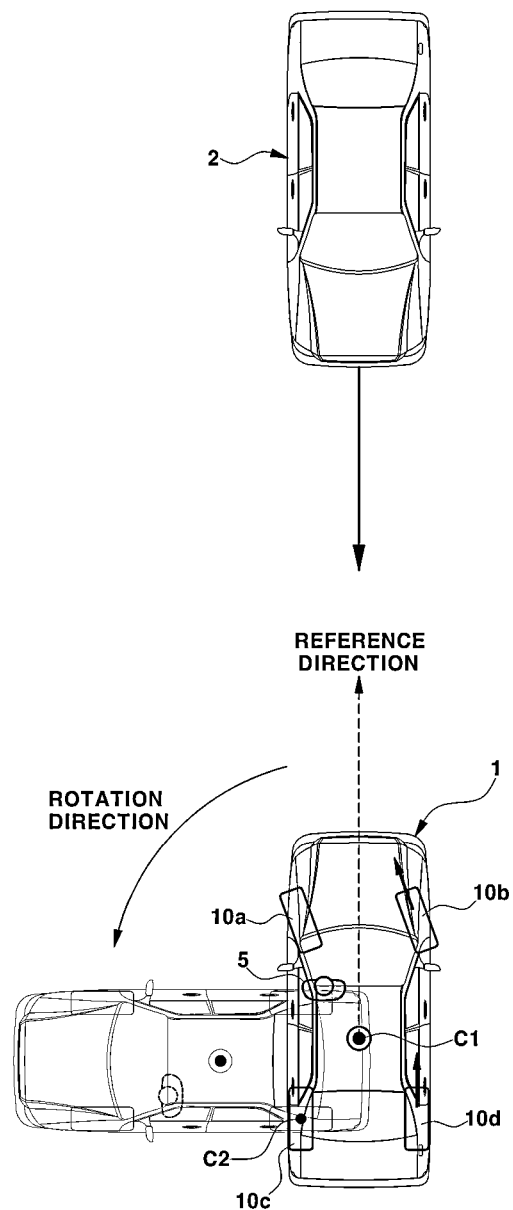
Figure 9:
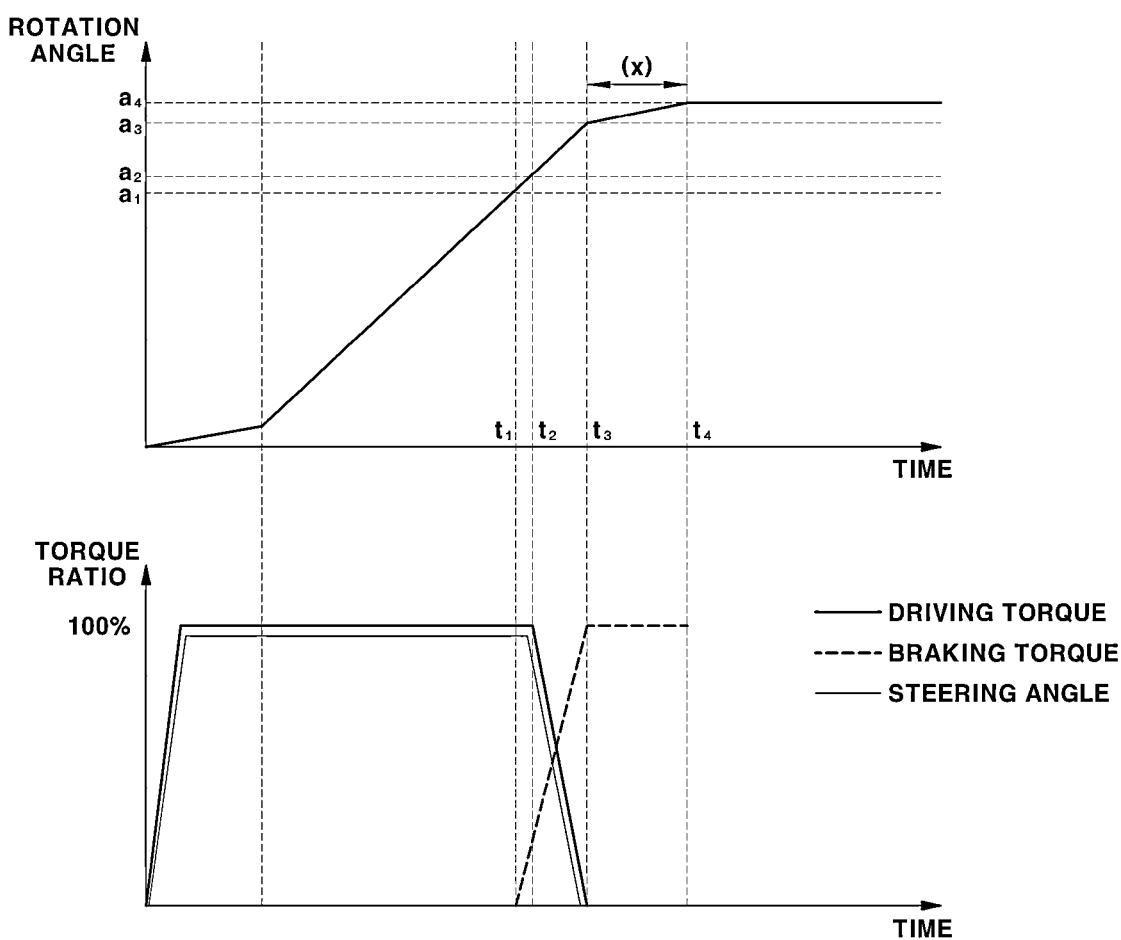
FIG. 9 is a diagram showing a time point at which driving torque or braking torque is applied to a wheel required to be driven among wheels of the host vehicle according to an embodiment of the present disclosure.

FIG. 6 is a flowchart showing a method of performing rotation control of the host vehicle according to an embodiment of the present disclosure. FIGS. 7 and 8 are diagrams showing examples of rotation control of the host vehicle according to an embodiment of the present disclosure. FIG. 9 is a diagram showing a time point at which driving torque or braking torque is applied to a wheel required to be driven among the wheels of the host vehicle according to an embodiment of the present disclosure. For simplicity of description, a duplicate description of the same configurations as those described above will be omitted.

Referring to FIGS. 1 and 6, the autonomous driving controller 100 may calculate data necessary to perform rotation control of the host vehicle using one of the safety index and the robustness index. The autonomous driving controller 100 may calculate the rotation direction and the rotation angle of the host vehicle based on one of the safety index and the robustness index and the heading angle of the other vehicle (S1100). The safety index may indicate the degree of damage to an occupant depending on the collision position and the position of the occupant. The robustness index may indicate the degree of damage to the host vehicle depending on the heading angle of the other vehicle and the collision position of the host vehicle. Since the degree of damage to the occupant and the degree of damage to the host vehicle increase as the speed of the other vehicle increases, the safety index and the robustness index may vary depending on the speed of the other vehicle. For example, the speed of the other vehicle may be divided into a medium speed and a high speed, and the safety index and the robustness index corresponding to the medium speed and the safety index and the robustness index corresponding to the high speed may be separately stored. The autonomous driving controller 100 may determine one of a plurality of safety indices and a plurality of robustness indices based on the speed of the other vehicle (S1100).

The center of rotation of the host vehicle may be determined based on the center of the host vehicle, the heading angle of the other vehicle, the rotation direction, and one of the robustness index and the safety index (S1200). The autonomous driving controller 100 may predict the collision position of the host vehicle based on the relationship between the center of the host vehicle and the heading angle of the other vehicle, may calculate the rotation direction and the rotation angle based on the predicted collision position and one of the safety index and the robustness index corresponding thereto, and may determine the center of rotation based on the rotation direction and one of the safety index and the robustness index. Since the collision position of the host vehicle may vary depending on the center of rotation, the autonomous driving controller 100 may determine the center of rotation so that the host vehicle is controlled such that collision occurs at an optimal collision position determined based on the safety index or the robustness index and such that the host vehicle is rotated in a direction away from the other vehicle (S1200).

The autonomous driving controller 100 may determine whether to drive or brake the wheels 10a, 10b, 10c, and 10d based on the rotation direction, the rotation angle, and the center of rotation (S1300).

The autonomous driving controller 100 may determine whether to drive at least one wheel required to be driven among the wheels 10a, 10b, 10c, and 10d in the forward direction or the backward direction. In addition, the autonomous driving controller 100 may determine a steering direction (S1400). For example, when the host vehicle is rotated by backward driving, the steering direction may be determined to be a direction opposite a target rotation direction of the host vehicle. When the host vehicle is rotated by forward driving, the steering direction may be determined to be the same direction as the target rotation direction of the host vehicle (S1400).

The autonomous driving controller 100 may transmit data on the steering direction and the steering angle to the steering controller 120. The autonomous driving controller 100 may transmit data on the wheel required to be braked and data on the braking torque to the brake controller 130. The autonomous driving controller 100 may transmit data on the wheel required to be driven and data on the driving torque to the motor controller 140. Braking of the wheel required to be braked and/or driving of the wheel required to be driven may be commenced by the brake controller 130 and the motor controller 140. When the center of rotation is the center of the host vehicle, all of the wheels 10a, 10b, 10c, and 10d may be driven. When the center of rotation is one of the wheels 10a, 10b, 10c, and 10d, the wheel corresponding to the center of rotation may be braked, and the wheels disposed on the side opposite the braked wheel may be driven (S1500).

Referring to FIGS. 1 and 7, another vehicle 2 is approaching the rear-left surface of the host vehicle 1. The autonomous driving controller 100 may calculate the expected collision position and the expected collision area taking into consideration the reference direction of the host vehicle 1 and the heading angle of the other vehicle 2. The autonomous driving controller 100 may confirm that the occupant 5 is located in the driver's seat using the internal camera 20. The autonomous driving controller 100 may determine that the position of the occupant 5 and the expected collision position do not correspond to each other. Therefore, the autonomous driving controller 100 may calculate the rotation direction, the rotation angle, and the center of rotation of the host vehicle 1 using the robustness index, rather than the safety index. In the case of rear-surface center collision of the host vehicle 1, the robustness index may have the largest value. Therefore, the autonomous driving controller 100 may calculate the rotation direction, the rotation angle, and the center of rotation so that the other vehicle 2 collides with the center portion of the rear surface of the host vehicle 1. The autonomous driving controller 100 may calculate an additional expected collision position after rotating the host vehicle 1 based on the calculated rotation direction, rotation angle, and center of rotation, and may determine whether the additional expected collision position corresponds to the position of the occupant. Since the occupant is located in the driver's seat, the expected collision position due to rear-surface center collision and the position of the occupant may not correspond to each other. Therefore, the autonomous driving controller 100 may determine a wheel required to be driven and a wheel required to be braked based on the calculated rotation direction, rotation angle, and center of rotation. The autonomous driving controller 100 may determine the right-rear wheel 10d to be the center of rotation C2 and may determine forward driving of the left wheels 10a and 10c in order to rotate the host vehicle in the clockwise direction. The autonomous driving controller 100 may transmit information that braking of the right-rear wheel 10d is required and information about braking torque to the brake controller 130 and may transmit information that forward driving of the left wheels 10a and 10c is required and information about driving torque to the motor controller 140. In this case, the values of driving torque applied to the left wheels 10a and 10c may be determined to be the maximum values, and the value of braking torque applied to the right-rear wheel 10d may be determined to be the maximum value. As the right-rear wheel 10d is braked and the left wheels 10a and 10c are driven in the forward direction, the host vehicle 1 may be rotated in the clockwise direction. In this embodiment, rotation of the host vehicle 1 may be controlled so as to minimize damage to the host vehicle 1 while minimizing damage to the occupant caused by collision.

Referring to FIGS. 1 and 8, the other vehicle 2 is approaching the front surface of the host vehicle 1. The autonomous driving controller 100 may calculate the expected collision position and the expected collision area taking into consideration the reference direction of the host vehicle 1 and the heading angle of the other vehicle 2. The autonomous driving controller 100 may confirm that the occupant 5 is located in the driver's seat using the internal camera 20. The autonomous driving controller 100 may determine that the position of the occupant 5 and the expected collision position correspond to each other. Therefore, the autonomous driving controller 100 may calculate the rotation direction, the rotation angle, and the center of rotation of the host vehicle 1 using the safety index. In the case of right-surface center collision or right-surface rear collision of the host vehicle 1, the safety index may have the largest value. Therefore, the autonomous driving controller 100 may calculate the rotation direction, the rotation angle, and the center of rotation so that the other vehicle 2 collides with the center portion or rear portion of the right surface of the host vehicle 1. The autonomous driving controller 100 may determine a wheel required to be driven and a wheel required to be braked based on the calculated rotation direction, rotation angle, and center of rotation. The autonomous driving controller 100 may determine the left-rear wheel 10c to be the center of rotation C2 and may determine forward driving of the right wheels 10b and 10d in order to rotate the host vehicle in the counterclockwise direction. When the host vehicle 1 is to be driven backward in the target rotation direction, the steering direction of the front wheels may be determined to be a direction opposite the target rotation direction. When the host vehicle 1 is to be driven forward in the target rotation direction, the steering direction of the front wheels may be determined to be the same direction as the target rotation direction. When the steering angle of the front wheels is used in order to quickly rotate the host vehicle 1, the length of a moment arm may be increased, and thus larger rotation torque may be obtained. When the front wheels are subjected to full-turn steering, i.e., when the steering angle of the front wheels is maximized in the same direction as the target rotation direction, larger rotation torque may be generated in the rotation direction of the host vehicle 1, and thus the host vehicle 1 may be rotated more quickly than when the steering angle of the front wheels is 0 degrees. Therefore, the autonomous driving controller 100 may determine the steering direction of the front wheels 10a and 10b to be the counterclockwise direction, i.e., the same direction as the rotation direction, and may determine the value of the steering angle to be the maximum value. The autonomous driving controller 100 may transmit information about the determined steering direction and steering angle to the steering controller 120. In addition, the autonomous driving controller 100 may transmit information that braking of the left-rear wheel 10c is required and information about braking torque to the brake controller 130 and may transmit information that forward driving of the right wheels 10b and 10d is required and information about driving torque to the motor controller 140. In this case, the values of driving torque applied to the right wheels 10b and 10d may be determined to be the maximum values, and the value of braking torque applied to the left-rear wheel 10c may be determined to be the maximum value. As the left-rear wheel 10c is braked and the right wheels 10b and 10d are driven in the forward direction, the host vehicle 1 may be rotated in the counterclockwise direction. In this embodiment, rotation of the host vehicle 1 may be controlled so as to minimize damage to the occupant caused by collision.

Referring to FIGS. 1, 6, and 9, the autonomous driving controller 100 may calculate a time point at which to stop driving of the wheels before the host vehicle reaches a position corresponding to the calculated target angle. The reason for this is that the host vehicle is additionally rotated due to inertia when the wheels that are driven are braked.

The autonomous driving controller 100 may calculate a braking start time point t1 of the wheel required to be driven, a driving end time point t2 of the wheel required to be driven, a time point t3 at which the braking force reaches a maximum value, and a time point t4 at which the rotation angle reaches a target rotation angle taking into consideration the rotation direction and the rotation speed (S1600). In FIG. 9, the rotation angle may be a rotation angle of the host vehicle. Further, "a1" may be a rotation angle of the host vehicle at a braking start time point of the driven wheel. Also, "a2" may be a rotation angle of the host vehicle at a driving end time point of the driven wheel. Also, "a3" may be a rotation angle of the host vehicle at a time point at which braking torque of the driven wheel reaches the maximum value. Further, "a4" may be a target rotation angle of the host vehicle. Also, "t1" may be a braking start time point of the driven wheel or a braking start time point of all of the wheels 10a, 10b, 10c, and 10d. Also, "t2" may be a driving end time point of the driven wheel. In more detail, the driving end time point of the wheel may be a time point at which driving torque is not applied to the motor providing driving force. Further, "t3" may be a time point at which braking force applied to the wheel reaches the maximum value. Also, "t4" may be a time point at which the host vehicle reaches a position corresponding to the target rotation angle. When the host vehicle is rotated, the host vehicle is not capable of immediately stopping at a position corresponding to the target rotation angle due to inertia. Therefore, it is necessary to calculate a time point at which to stop application of driving torque to the wheels 10a, 10b, 10c, and 10d of the host vehicle and a time point at which to apply braking torque to the wheels so that the host vehicle stops at a position corresponding to the calculated rotation angle. The driving system and the brake system of the host vehicle, which generate driving torque and braking torque, may have different response speeds due to the characteristics thereof. For example, when the driving system is a motor and the brake system is a hydraulic brake device, the motor may have a relatively high response speed, and the hydraulic brake device may have a relatively low response speed. Therefore, the time point at which to stop application of driving torque is determined based on the responsiveness of the driving system, and the time point at which to increase the braking torque is determined based on the responsiveness of the brake system.

The autonomous driving controller 100 may predict the time point t3 taking into consideration the occurrence of additional rotation due to rotational inertia. The specifications of the host vehicle and the rotation speed of the host vehicle may be predetermined values, and the time taken for braking torque to reach the maximum value after commencement of braking due to the response characteristics of the brake system may be determined in advance. Accordingly, the time point t4 at which the host vehicle reaches a position corresponding to the target rotation angle may be determined, and the time point t3 may be predicted based on the time point t4. Even when the maximum braking torque is applied to the wheel, it takes time for the braking torque by the wheel to reach the maximum value. Therefore, the autonomous driving controller 100 may calculate the braking start time point t1 of the driven wheel based on the time point t3. In addition, even when driving torque is not applied to the wheel, it may take time for driving of the wheel to stop. Therefore, the autonomous driving controller 100 may calculate, based on the time point t3, the time point t2 at which application of the driving torque to the wheel is stopped (S1600).

The motor controller 140 may commence braking of all of the wheels 10a, 10b, 10c, and 10d at the time point t1, and the brake controller 130 may terminate driving of the driven wheels at the time point t2 (S1700).

The driving torque of the driven wheel may be gradually reduced from the time point t2 to the time point t3 and may become zero at the time point t3. The braking torque by the driven wheel may reach the maximum value at the time point t3. During the time period x between the time point t3 and the time point t4, the driving torque of the wheels 10a, 10b, 10c, and 10d is zero, but additional rotation may occur due to rotational inertia. The host vehicle may reach a position corresponding to the target angle through additional rotation due to rotational inertia. At this time, the brake controller 130 may stop application of the braking torque to the wheels 10a, 10b, 10c, and 10d. If the maximum braking torque is applied to the wheels 10a, 10b, 10c, and 10d of the host vehicle at the time of collision between the host vehicle and another vehicle, a larger degree of damage may be caused to the host vehicle. Therefore, when the rotation angle of the host vehicle reaches the target angle, the brake controller 130 may terminate braking of the wheels 10*a*, 10*b*, 10*c*, and 10*d* (S1800).

When the occurrence of collision between the host vehicle and another vehicle is confirmed, the brake controller 130 may brake the wheels 10*a*, 10*b*, 10*c*, and 10*d* to the maximum extent and thus may prevent secondary damage due to a change in the position of the host vehicle due to the collision (S1900). When the movement of the host vehicle stops after the occurrence of collision, the autonomous driving controller 100 may notify the driver of the occurrence of collision (S1900).

As is apparent from the above description, according to the embodiment of the present disclosure, a host vehicle in a turned-off state may determine the possibility of collision with another vehicle by itself based on a safety index or a robustness index and may determine whether to perform rotation control thereof by itself, thereby minimizing damage to an occupant caused by collision with another vehicle when there is an occupant in the host vehicle in a parked state.

According to the embodiment of the present disclosure, a determination as to whether the position of an occupant corresponds to an expected collision position is made, and rotation control of the host vehicle is performed based on the safety index, whereby damage to the occupant may be minimized. In addition, when the position of the occupant does not correspond to an expected collision position, rotation control of the host vehicle is performed based on the robustness index. Thus, damage to the host vehicle caused by collision may be minimized.

According to the embodiment of the present disclosure, it is possible to calculate data for minimization of damage to the occupant caused by collision as well as minimization of damage to the host vehicle caused by collision by determining the corresponding relationship between an initial expected collision position, an additional expected collision position after rotation control, and the position of the occupant.

The present disclosure has been described above with reference to an embodiment. The embodiment described in the specification and shown in the accompanying drawings is illustrative only and is not intended to represent all aspects of the disclosure. Therefore, the present disclosure is not limited to the embodiment presented herein, and it should be understood by those having ordinary skill in the art that various modifications or changes can be made without departing from the technical spirit or scope of the disclosure as disclosed in the appended claims.

What is claimed is:

1. A system for reducing damage to an occupant caused by collision, the system comprising an autonomous driving controller configured to:
    calculate data necessary to control rotation of a host vehicle when collision between the host vehicle and another vehicle is expected;
    determine an initial expected collision position in a stopped state based on a heading angle of the other vehicle approaching the host vehicle and a center of the host vehicle;
    determine whether the initial expected collision position and a position of an occupant of the host vehicle correspond to each other; and
    upon determining that the initial expected collision position and the position of the occupant correspond to each other, calculate data necessary to rotate the host vehicle based on a safety index indicating a degree of damage to the occupant depending on a final collision position and the position of the occupant.

2. The system of claim 1, wherein:
    the autonomous driving controller is configured to calculate a collision index indicating possibility of collision between the host vehicle and the other vehicle while the other vehicle approaches the host vehicle;
    when the collision index is equal to or greater than a first threshold value, the autonomous driving controller is configured to supply power to components configured to rotate the host vehicle;
    when the collision index is equal to or greater than a second threshold value, the autonomous driving controller is configured to determine whether the initial expected collision position and the position of the occupant correspond to each other; and
    the second threshold value is larger than the first threshold value.

3. The system of claim 1, wherein, when the initial expected collision position and the position of the occupant do not correspond to each other, the autonomous driving controller is configured to calculate data necessary to rotate the host vehicle so as to minimize damage to the host vehicle using a robustness index indicating a degree of damage to the host vehicle depending on the heading angle of the other vehicle and the collision position.

4. The system of claim 1, wherein:
    a collision index is calculated based on at least one of a speed of the other vehicle, a distance between the host vehicle and the other vehicle, or an expected collision area; and
    the expected collision area is an area in which a virtual shape indicating the other vehicle overlaps a virtual shape indicating the host vehicle, wherein the other vehicle is in a state of being moved at the heading angle and by a distance between a center of the host vehicle and the center of the other vehicle.

5. The system of claim 4, wherein a determination as to whether the initial expected collision position and the position of the occupant correspond to each other is a determination as to whether the occupant is located within the expected collision area.

6. The system of claim 3, wherein:
    when the initial expected collision position and the position of the occupant do not correspond to each other, the autonomous driving controller is configured to calculate, using the robustness index, a rotation direction, a rotation angle, and a center of rotation of the host vehicle as data necessary to rotate the host vehicle;
    the autonomous driving controller is configured to determine whether an additional expected collision position corresponds to the position of the occupant; and
    the additional expected collision position is an expected collision position between the host vehicle and the other vehicle after the host vehicle is rotated based on the rotation direction, the rotation angle, and the center of rotation of the host vehicle.

7. The system of claim 6, wherein:
    upon determining that the additional expected collision position corresponds to the position of the occupant, the autonomous driving controller is configured to not perform rotation control of the host vehicle; and
    upon determining that the additional expected collision position does not correspond to the position of the occupant, the autonomous driving controller is configured to output a command to rotate the host vehicle based on the rotation direction, the rotation angle, and the center of rotation of the host vehicle.

8. The system of claim 3, wherein:
the robustness index is calculated based on a repair cost of the host vehicle varying depending on a collision position between the host vehicle and the other vehicle; and
the robustness index is determined based on a value obtained by dividing an expected repair cost at a specific collision position by a maximum repair cost selected from among expected repair costs at a plurality of collision positions.

9. The system of claim 1, wherein:
the safety index is calculated based on the degree of damage to the occupant depending on the collision position between the host vehicle and the other vehicle; and
the safety index is determined based on a value obtained by dividing a specific expected degree of damage at a specific collision position depending on a specific position of the occupant at the specific collision position by a maximum degree of damage.

10. The system of claim 3, wherein:
the autonomous driving controller is configured to calculate, using the robustness index or the safety index, a rotation direction, a rotation angle, and a center of rotation of the host vehicle as data necessary to rotate the host vehicle;
when the robustness index is used, the autonomous driving controller is configured to calculate the rotation direction, the rotation angle, and the center of rotation so that collision with the other vehicle occurs at a collision position at which a value of the robustness index is large; and
when the safety index is used, the autonomous driving controller is configured to calculate the rotation direction, the rotation angle, and the center of rotation so that collision with the other vehicle occurs at a collision position at which a value of the safety index is large.

11. The system of claim 10, further comprising a motor controller configured to control driving of a motor mounted to each of wheels of the host vehicle and a brake controller configured to control braking of a brake device mounted to each of the wheels of the host vehicle based on the rotation direction, the rotation angle, and the center of rotation calculated by the autonomous driving controller.

12. A method of reducing damage to an occupant caused by collision, the method comprising:
detecting, by sensors, movement of another vehicle approaching a host vehicle in a stopped state;
determining, by a controller, a possibility of collision by calculating a collision index indicating the possibility of collision between the host vehicle and the other vehicle;
determining, by the controller, whether an initial expected collision position calculated based on a heading angle of the other vehicle approaching the host vehicle and a center of the host vehicle corresponds to a position of an occupant of the host vehicle; and
depending on whether or not the initial expected collision position and the position of the occupant correspond to each other, calculating, by the controller, data necessary to rotate the host vehicle based on either a safety index indicating a degree of damage to the occupant depending on a final expected collision position and the position of the occupant or a robustness index indicating a degree of damage to the host vehicle depending on the heading angle of the other vehicle and the final expected collision position.

13. The method of claim 12, wherein determining the possibility of collision comprises
determining whether the collision index is equal to or greater than a first threshold value to determine whether to supply power to components configured to rotate the host vehicle, and
determining whether the collision index is equal to or greater than a second threshold value to determine whether it is possible to avoid collision between the host vehicle and the other vehicle through rotation control of the host vehicle.

14. The method of claim 12, wherein:
the collision index is calculated based on at least one of a speed of the other vehicle, a distance between the host vehicle and the other vehicle, or an expected collision area; and
the expected collision area is an area in which a virtual shape indicating the other vehicle overlaps a virtual shape indicating the host vehicle, wherein the other vehicle is in a state of being moved at the heading angle and by a distance between a center of the host vehicle and the center of the other vehicle.

15. The method of claim 14, wherein determining whether the initial expected collision position corresponds to the position of the occupant of the host vehicle comprises determining whether the occupant is located within the expected collision area.

16. The method of claim 12, wherein calculating the data necessary to rotate the host vehicle is performed based on the safety index when the initial expected collision position corresponds to the position of the occupant.

17. The method of claim 12, wherein calculating the data necessary to rotate the host vehicle comprises:
calculating, using the robustness index, a rotation direction, a rotation angle, and a center of rotation of the host vehicle as data necessary to rotate the host vehicle when the initial expected collision position does not correspond to the position of the occupant; and
determining whether an additional expected collision position corresponds to the position of the occupant, the additional expected collision position being an expected collision position between the host vehicle and the other vehicle after rotating the host vehicle based on the rotation direction, the rotation angle, and the center of rotation of the host vehicle.

18. The method of claim 17, wherein, when the additional expected collision position corresponds to the position of the occupant, rotation control of the host vehicle is not performed.

19. The method of claim 17, further comprising, when the additional expected collision position does not correspond to the position of the occupant, outputting, by the controller, a command to rotate the host vehicle based on the rotation direction, the rotation angle, and the center of rotation of the host vehicle.

20. The method of claim 12, further comprising controlling driving of a motor mounted to each of wheels of the host vehicle and braking of a brake device mounted to each of the wheels of the host vehicle based on a rotation direction, a rotation angle, and a center of rotation of the host vehicle as data necessary to rotate the host vehicle.

* * * * *